US007723879B2

(12) United States Patent
Fujii et al.

(10) Patent No.: US 7,723,879 B2
(45) Date of Patent: May 25, 2010

(54) MOTOR HAVING MULTIPLE BUSBAR PLATES AND WIRE FOR THE SAME

(75) Inventors: Yoshio Fujii, Kyoto (JP); Yosuke Yamada, Kyoto (JP); Hideaki Suzuki, Kyoto (JP)

(73) Assignee: Nidec Corporation, Kyoto (JP)

( * ) Notice: Subject to any disclaimer, the term of this patent is extended or adjusted under 35 U.S.C. 154(b) by 68 days.

(21) Appl. No.: 11/954,420

(22) Filed: Dec. 12, 2007

(65) Prior Publication Data

US 2008/0136274 A1 Jun. 12, 2008

(30) Foreign Application Priority Data

Dec. 12, 2006 (JP) ............................ 2006-334198
Dec. 12, 2006 (JP) ............................ 2006-334200

(51) Int. Cl.
*H02K 3/50* (2006.01)
*H02K 15/085* (2006.01)

(52) U.S. Cl. ........................................ 310/71; 310/201

(58) Field of Classification Search .................. 310/71, 310/201, 179, 180, 184, 208; 439/874, 761, 439/877
See application file for complete search history.

(56) References Cited

U.S. PATENT DOCUMENTS 7,150,631 B2 * 12/2006 Reed et al. .................... 439/34
7,196,443 B2 * 3/2007 Kimura et al. ................ 310/71
7,202,581 B2 * 4/2007 Sasaki et al. .................. 310/71
7,262,529 B2 * 8/2007 Klappenbach et al. ........ 310/71
7,456,533 B2 * 11/2008 Nanbu et al. .................. 310/71
2007/0007832 A1 * 1/2007 Ichikawa et al. .............. 310/71

FOREIGN PATENT DOCUMENTS

JP 03-155358 A 7/1991
JP 04-244752 A 9/1992
JP 05-300687 A 11/1993
JP 06-141496 A 5/1994
JP 3474660 B2 12/2003
JP 2005-065374 A 3/2005

* cited by examiner

*Primary Examiner*—Michael C Zarroli
(74) *Attorney, Agent, or Firm*—Keating & Bennett, LLP

(57) ABSTRACT

A stator of a motor includes a plurality of busbar plates, each laminated above a stator core in an axial direction and connected to a plurality of wires having a substantially U-shaped configuration. Each busbar plate includes a plurality of busbars arranged in a circumferential direction, and a busbar holder of insulating quality to which the plurality of busbars are integrally affixed. The wires include a line portion, and a connecting end portion having a substantially columnar shape protruding from an end surface of the line portion. The busbar makes contact with the end surface of the line portion and is connected by welding to the connecting end portion.

15 Claims, 24 Drawing Sheets

MOTOR HAVING MULTIPLE BUSBAR PLATES AND WIRE FOR THE SAME

BACKGROUND OF THE INVENTION

1. Field of the Invention

The present invention relates to a motor, a stator of the motor, a configuration of a wire in the stator, and a manufacturing method of the same.

2. Description of the Related Art

In recent years, various components and mechanisms used in a vehicle have been developed with a specific focus on environmental concerns (e.g., energy efficiency, reduction of carbon dioxide emission, and the like). One of such mechanisms is an "idling stop" mechanism which allows an engine of a vehicle that is not in motion to automatically stop in order to reduce the carbon dioxide emission.

However, when a compressor is activated by the engine of such vehicle, each time the engine stops, the components activated by the compressor, such as an air conditioner, also stop. In order to avoid such inconvenience, the compressor of the components, such as an air conditioner, is operated by a motor (e.g., IPM (Interior Permanent Magnet)). That is, the compressor is activated by a car battery, which allows the air conditioner to continue to operate even while the engine is not running. The IPM motor has a high reliability due to a secure connection between the rotor core and a permanent magnet thereof, and is suitable due to its high resistance against thermal demagnetization for use in a motor vehicle.

Since the motor operated compressor is expected to produce a large output while running on a car battery having a relatively low voltage, an electric current run through coils of the stator of such motor becomes great. In order to minimize an amount of heat generated by the coils in such motor, wires having a large cross section (e.g., the wires are rectangular shaped) are used to form the coils.

Conventionally, the wire whose large and rectangular shaped cross section makes it difficult to manipulate when winding the wires around teeth of a stator core to form coils are formed to have a substantially U-shaped configuration prior to being inserted between the teeth. Conventionally, a large circumferential gap between the angular wire and the terminals to be connected thereto is required so as to allow enough space to carry out the connection between the angular wire and the terminal, and therefore required the dimension of the busbar to be enlarged. Such configuration consequently enlarged the dimension of the entire motor.

SUMMARY OF THE INVENTION

In order to overcome the problems described above, preferred embodiments of the present invention provide a motor including a stator having an annular shape centered about a predetermined central axis. The stator includes a stator core having a plurality of teeth extending in a radial direction and arranged evenly apart from one another in a circumferential direction centered about the central axis, a plurality of wires having a portion extending in a direction parallel or substantially parallel with the central axis and arranged at a plurality of slots each defined between the teeth, a first busbar plate arranged at one axial side of the stator core and including an insulator retaining a plurality of first busbars connected to a portion of the wires, and a second busbar plate arranged at one axial side of the first busbar plate and including an insulator retaining a plurality of second busbars connected to a portion of the wires.

A wire used in the stator of the motor according to the present invention includes a line portion, and a connecting end portion protruding from an end surface of the line portion having a side surface including an exposed conductive material, and integrally connected to the line portion.

A manufacturing method of the stator of the motor according to another preferred embodiment of the present invention includes the steps of inserting the plurality of wires each including a portion extending in a direction parallel or substantially parallel to a central axis through a corresponding slot defined between the plurality of teeth, the plurality of teeth are arranged evenly apart from one another in a circumferential direction extending from the stator core, arranging at one axial side of the stator core the first busbar plate in which a plurality of first busbars are retained by an insulator, connecting the plurality of first busbars to a portion of the plurality of wires, arranging at one axial side of the first busbar plate a second busbar plate in which a plurality of second busbars are retained by the insulator, and connecting the plurality of second busbars to a portion of the wires.

The plurality of first busbars of the first busbar plate and the plurality of second busbars of the second busbar plate of the stator of the motor according to a preferred embodiment of the present invention each includes a hole portion or a notched portion. The connecting end portion of the wire is inserted and connected to the first busbars and the second busbars.

Other features, elements, steps, characteristics and advantages of the present invention will become more apparent from the following detailed description of preferred embodiments thereof with reference to the attached drawings.

BRIEF DRAWING OF THE DRAWING

DETAILED DESCRIPTION OF PREFERRED EMBODIMENTS

Figure 1:
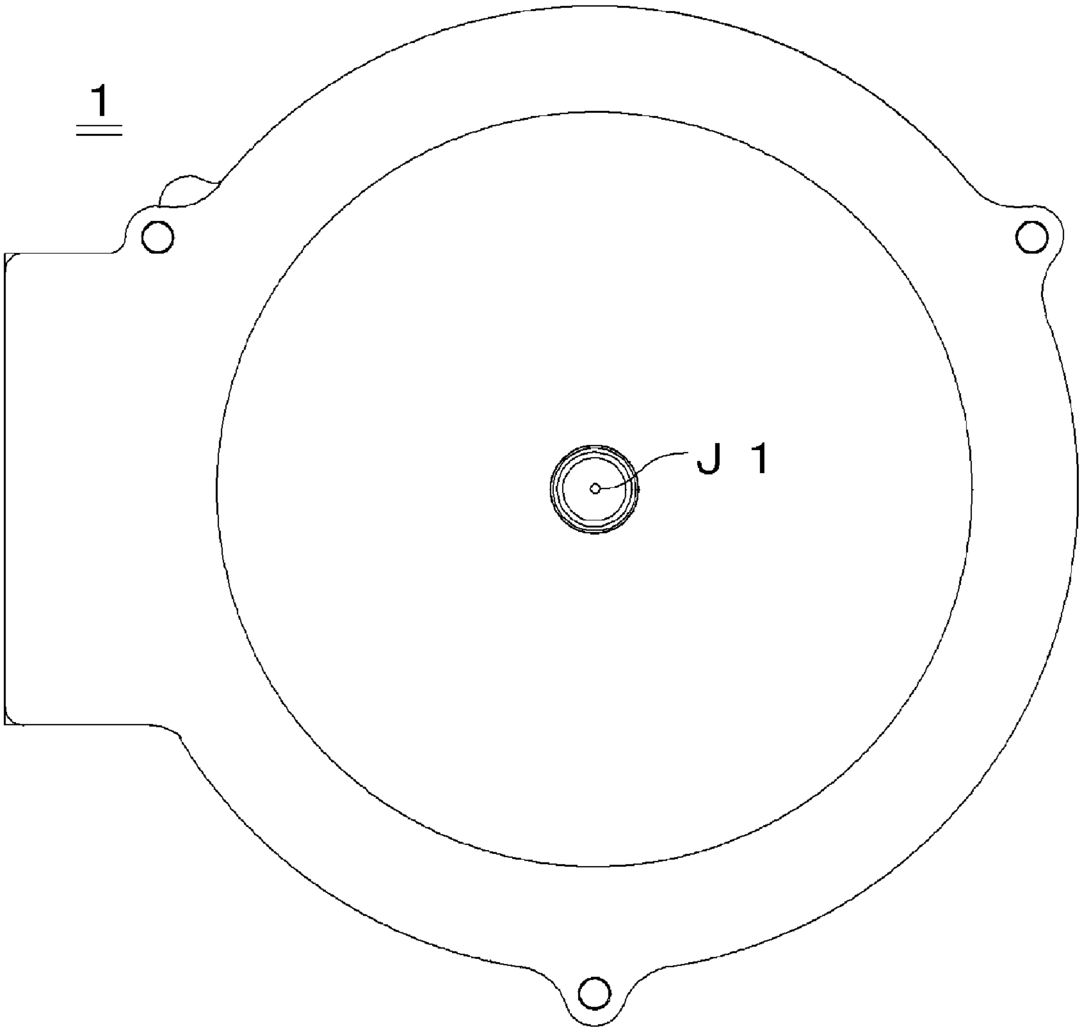
FIG. 1 is a schematic plan view of an exterior of a motor according to a preferred embodiment of the present invention.

Note that in the description of preferred embodiments of the present invention herein, words such as upper, lower, left, right, upward, downward, top and bottom for describing positional relationships between respective members and directions merely indicate positional relationships and direction in the drawings. Such words do not indicate positional relationships and directions of the members mounted in an actual device. Also note that reference numerals, figure numbers and supplementary descriptions are shown below for assisting the reader in finding corresponding components in the description of the preferred embodiments below to facilitate the understanding of the present invention. It should be understood that these expressions in no way restrict the scope of the present invention.

Figure 2:
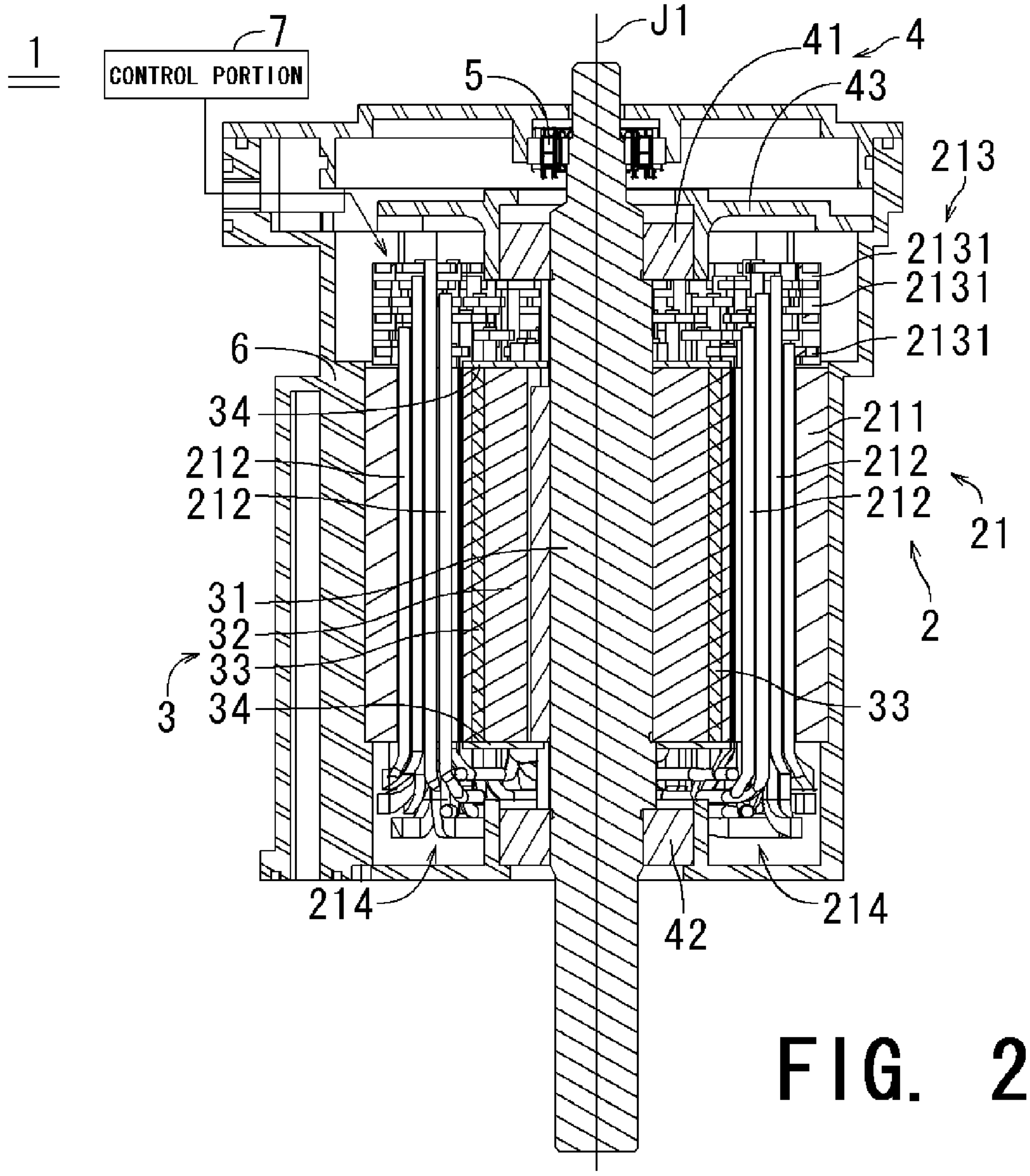
FIG. 2 is a schematic longitudinal sectional view in an axial direction of the motor shown in FIG. 1.

FIG. 1 is a schematic plan view of an exterior of a motor 1 according to a first preferred embodiment of the present invention. FIG. 2 is a schematic cross sectional view of the motor 1.

The motor 1 is a three phase motor which will be used in a compressor for an air conditioner, or the like, in a vehicle having an idling stop mechanism (a mechanism for automatically stopping an engine of the vehicle when not in motion). As shown in FIG. 2, the motor 1 is shaped such that the central axis J1 is approximately twice as long as a radial length thereof.

As shown in FIG. 2, the motor 1 which is an inner rotor type motor preferably includes a stator portion 2 which is a fixed assembly, a rotor portion 3 which is a rotatable assembly, a bearing mechanism 4 which is arranged at the stator portion 2 and rotatably supports the rotor portion 3 with respect to the stator portion 2 in a concentric manner with the central axis J1, a resolver portion 5 which detects a rotational angle of the rotor portion 3 relative to the stator portion 2, and a housing 6 which accommodates therein the stator portion 2, the rotor portion 3, the bearing mechanism 4 and the resolver portion 5. The housing 6 preferably includes a cylindrical portion for retaining the stator 21 (described below), and a bottom portion for covering a lower side of the stator 21.

Figure 3:
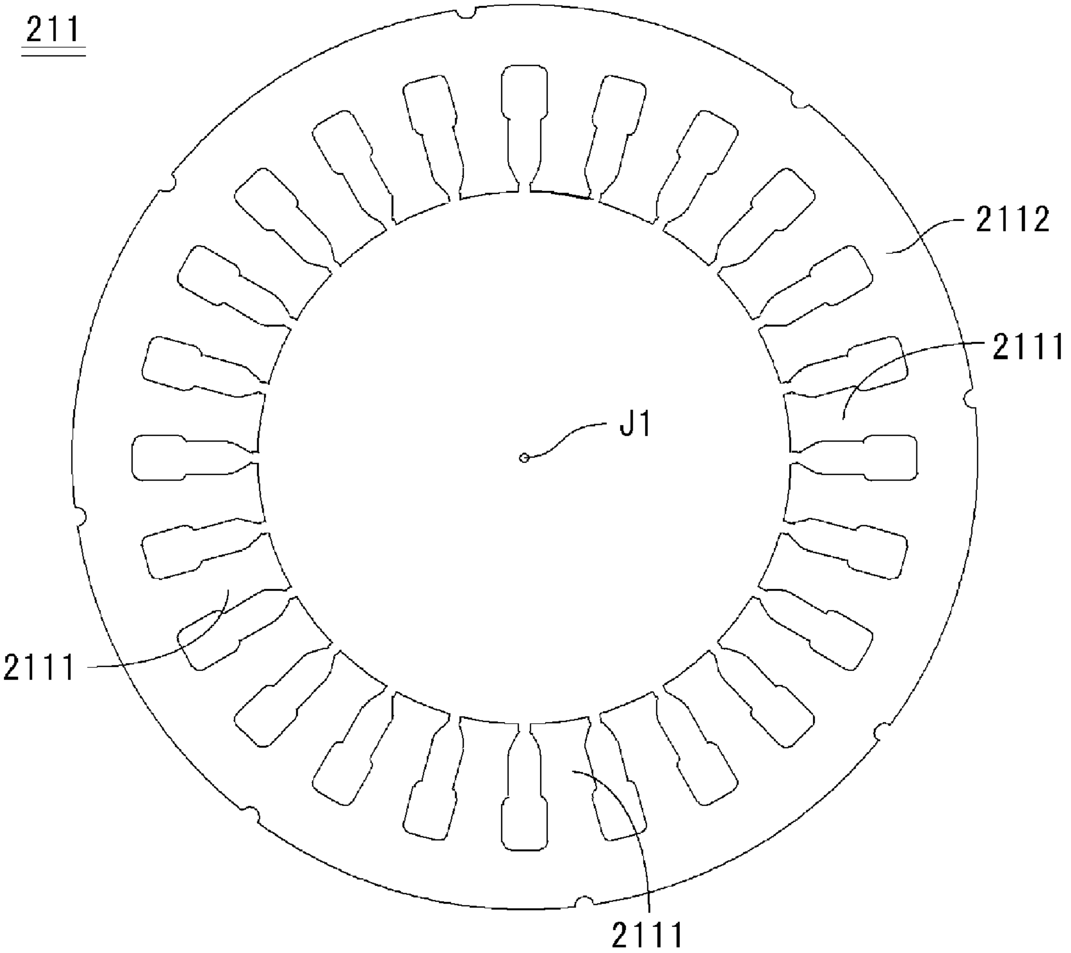
FIG. 3 is a schematic plan view of a stator core of a stator according to a preferred embodiment of the present invention.

The stator portion 2 preferably includes the stator 21 arranged at an inner circumferential surface of the housing 6. The stator 21 preferably includes a stator core 211 which is formed by laminating a plurality of thin silicon steel plates on top of one another. FIG. 3 is a schematic plan view of the stator core 211 according to the present preferred embodiment. As shown in FIG. 3, the stator core 211 preferably includes a plurality (for example, 24 in the present preferred embodiment) of teeth 2111 each extending outwardly in the radial direction centered about the central axis J1, each arranged evenly apart from one another in the circumferential direction, and a core back portion 2112 having a substantially annular shape arranged at an end portion of the teeth away from the central axis J1.

Figure 4:
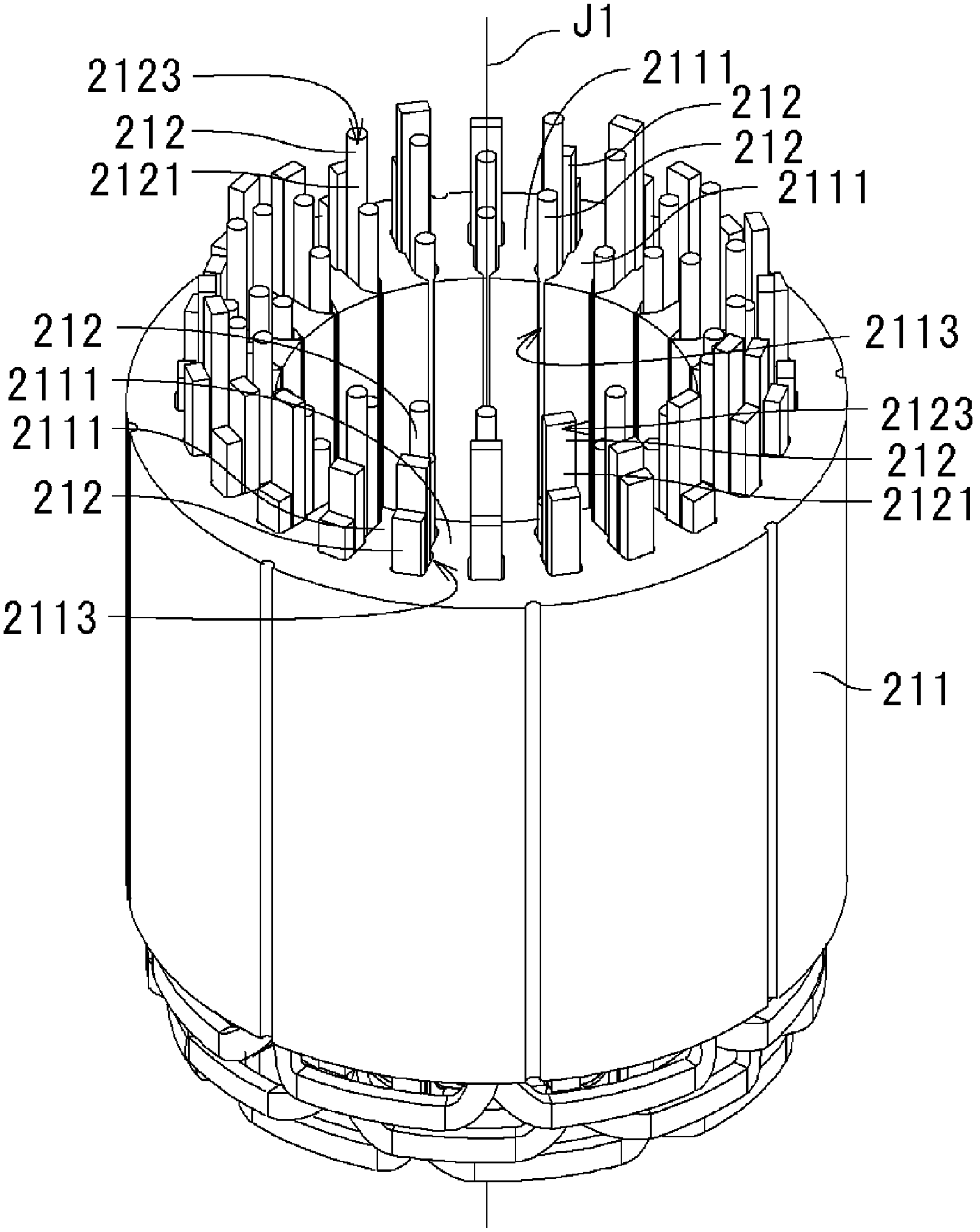
FIG. 4 is a schematic perspective view of a plurality of wires connected to the stator core of the stator according to a preferred embodiment of the present invention.

FIG. 4 is a schematic perspective view of the stator core 211 and a plurality (for example, 48 in the present preferred embodiment) of wires 212 each attached to the stator core 211. As shown in FIG. 4, each wire 212 preferably includes a portion which extends in a parallel manner with the central axis J1 at a slot 2113 which is defined between each two adjacent teeth 2111 (i.e., in total, the stator core 211 includes 24 of slots 2113). The plurality of wires 212 include a plurality of angular wires 212*a* (shown in FIG. 5A), and a plurality of round wires 212*b* (shown in FIG. 5B). Note that in the description hereafter the angular wire 212*a* and the round wire 212*b* will be collectively referred to as the wire 212 unless the distinction therebetween is necessary.

Figure 5A:
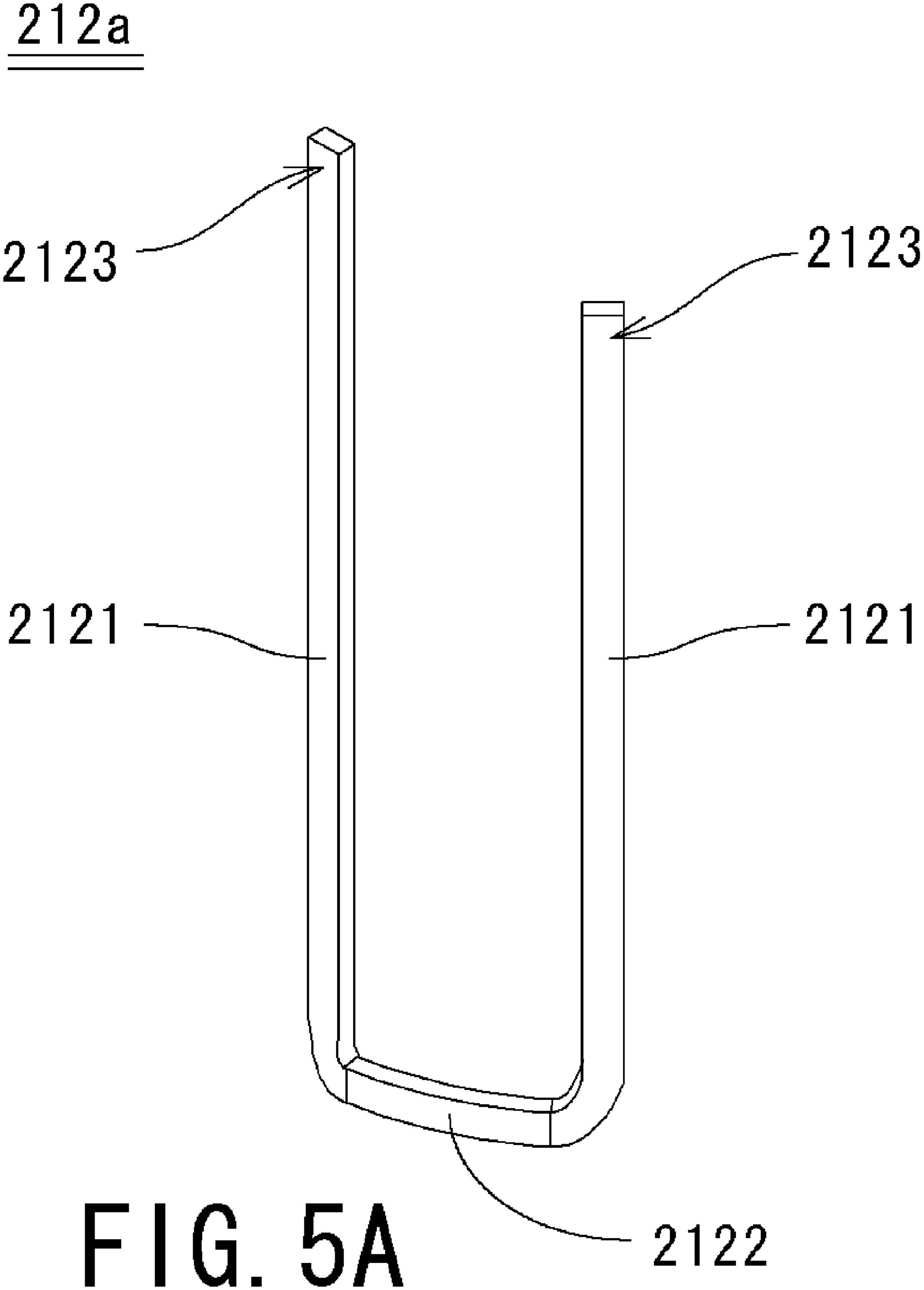
FIG. 5A is a schematic cross sectional view of an angular wire according to a preferred embodiment of the present invention.
Figure 5B:
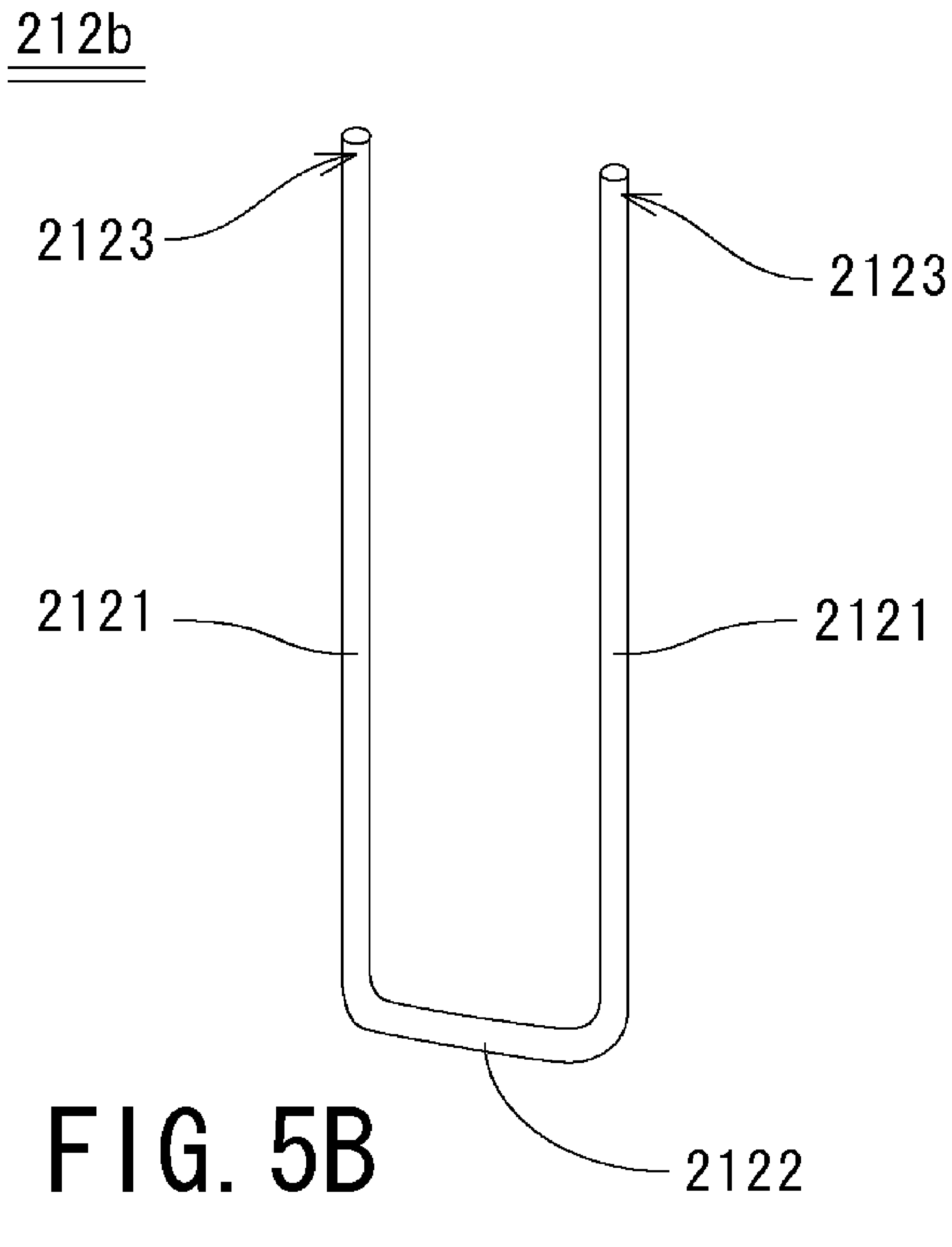
FIG. 5B is a schematic cross sectional view of a round wire according to a preferred embodiment of the present invention.

As shown in FIG. 5A and FIG. 5B, the angular wire 212*a* and the round wire 212*b* both have an approximately U-shaped configuration. Note that in the present preferred embodiment, a diameter of a cross section of the round wire 212*b* preferably is greater than approximately 3.16 mm and smaller than approximately 3.24 mm, for example. In addition, a cross section of the angular wire 212*a* preferably is greater than approximately 12.3 $mm^2$, for example.

The angular wire 212*a* and the round wire 212*b* are accommodated in corresponding slots 2113 (see FIG. 4). As shown in FIGS. 5A and 5B, the angular wire 212*a* and the round wire 212*b* each include a pair of straight portions 2121 extending in a direction parallel or substantially parallel to the central axis J1, and a connecting portion 2122 which connects continuously the pair of the straight portions 2121 together at an axially bottom portion thereof so as to form the approximately U-shaped configuration. As shown in FIG. 4, the wires 212 each include a pair of the end portions which protrude in an upward direction from the slot 2113.

Figure 6:
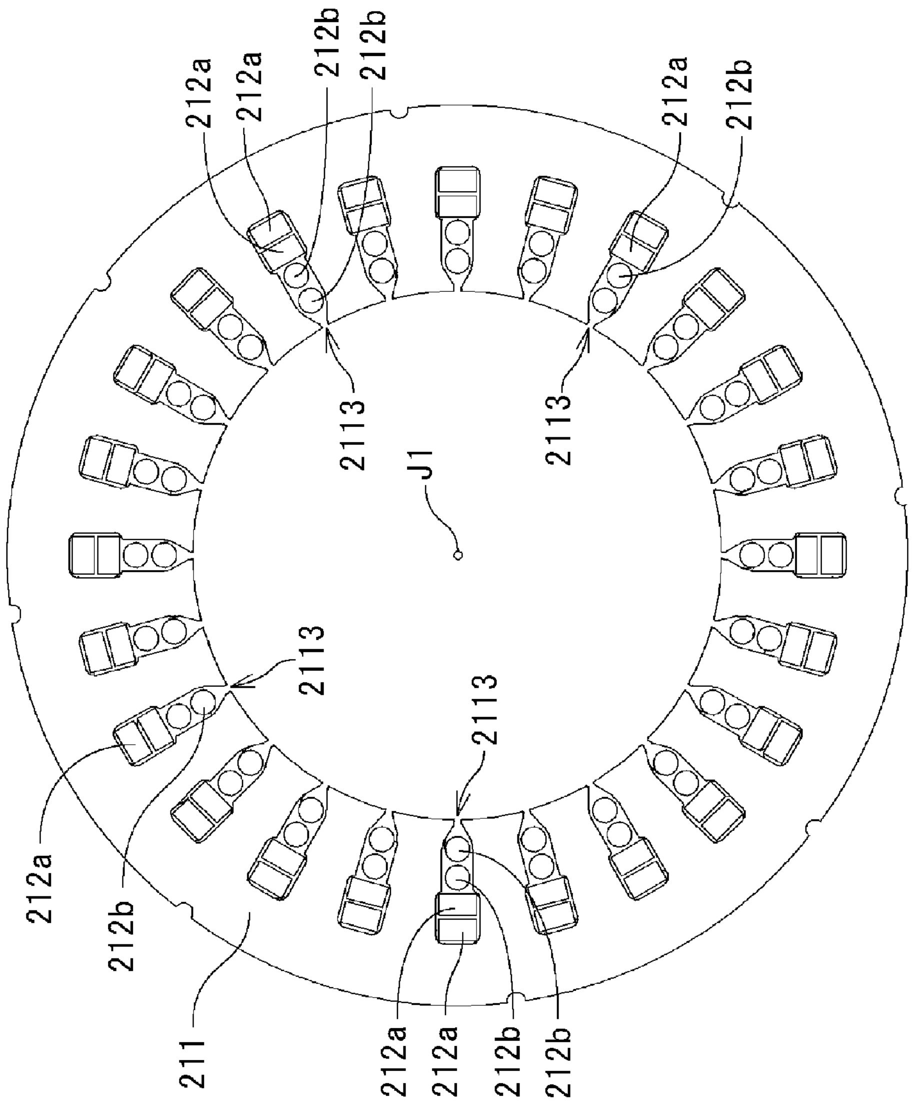
FIG. 6 is a schematic cross sectional view in a perpendicular manner with respect to a central axis of the stator core and the wires according to a preferred embodiment of the present invention.

FIG. 6 is a schematic cross sectional view of the stator core 211 and the wires 212. Note that for clarity of illustration, FIG. 6 omits parallel diagonal lines at the cross section of the stator core 211 and the wires 212. As shown in FIGS. 5A, 5B and 6, each slot 2113 of the stator core 211 has arranged therein two angular wires 212*a* and two round wires 212*b* in the radial direction. Note that the round wires 212*b* are arranged nearer to the central axis J1 than the angular wires 212*a* are.

As shown in FIG. 2, the stator 21 preferably includes a busbar unit 213 which is arranged axially above the stator core 211 and connected to an end portion 2123 (see FIG. 4) of the wire 212. The busbar unit 213 having a substantially annular shape centered about the central axis J1 preferably includes a plurality (for example, 6 in the present preferred embodiment) of busbar plates 2131 which define a main busbar plate. In the description hereafter, in order to distinguish one busbar plate 2131 from another, each busbar plate 2131 is assigned with a reference numeral 2131*a* to 2131*f* from the bottom one to the top one in the axial direction, respectively.

FIGS. 7A to 7F are schematic plan view of the busbar plates 2131*a* to 2131*f*. As shown in FIGS. 7A to 7F, each busbar plate 2131 preferably includes a plurality of busbars 2132 which are conductive terminals and are arranged so as to be evenly spaced apart from one another in the circumferential direction, and a busbar holder 2133 which is a terminal retainer having an insulating quality (e.g., resin material) and a substantially annular shape centered about the central axis J1 and to which the plurality of busbars 2132 are integrally affixed. In each busbar plate 2131, the busbars 2132 are affixed to the busbar holder 2133 at a portion inwardly of an outer circumferential edge of the busbar holder 2133.

According to the busbar unit 213 shown in FIG. 2, the busbars 2132 arranged at each of the 6 busbar holders 2133 are arranged at different axial positions from one another. Also, the busbars 2132 are connected to a portion of the plurality of wires 212. According to the stator 21, the end portion 2133 of each wire 212 is connected above the stator core 211 in series in the circumferential direction by the plurality of busbars 2132 (see FIGS. 7A and 7B) of each busbar plate 2131. By the virtue of such configuration, the coils 214 will be formed above the teeth 2111 of the stator core 211.

The stator 21 preferably includes a plurality of coils 241 each formed by wires 212 wound in a distributed manner around a set of three teeth 2111 next to one another as a unit. That is, two slots 2113 which are next to one another are sandwiched between two slots 2113 through which a single wire 212 including two straight portions 2121 is arranged. According to the present preferred embodiment, each coil 241 preferably includes the wire 212 wound twice around the teeth and is formed of each angular wire 212*a* and round wire 212*b* connected to one another. Note that each coil 241 is connected to an external power supply via the bus bar unit 213.

According to FIGS. 7A to 7F, an external diameter of the busbar plates 2131*a* to 2131*f* is smaller than an external diameter of the stator core 211. Therefore, the plurality of busbars 2132, and a connecting portion 2132*a* between each busbar 2132 and the wire 212 are arranged inwardly of an outer circumferential end of the stator core 211. By virtue of such configuration, the wires 212 and the connecting portions 2132*a* will be connected at an area located inwardly of the outer circumferential end of the stator core 211. Note that the connection between the plurality of busbars 2132 of each busbar plate 2131*a* to 2131*f* and the wires 212 is preferably carried out by TIG welding.

The rotor portion 3 shown in FIG. 2 preferably includes a shaft 31 concentric with the central axis J1, a rotor core 32 having a substantially cylindrical shape which is attached to the shaft 31 by a force fit or the like, a plurality of field magnets 33 which are thin plates of permanent magnet extending in the direction parallel to the central axis J1 and retained by the rotor core 32, and a rotor cover 34 which has a substantially discoid shape covers both axial end surfaces of the rotor core 32. The rotor core 32 is formed by laminating in the axial direction a plurality of thin magnetic steel plates on top of another. Also, the rotor cover 34 is made of a non-magnetic material (e.g., resin or aluminum or the like). Also, the rotor cover 34 is affixed to the rotor core 32 by a bolt or the like. Also, the rotor cover 34 minimizes an axial movement of the field magnet 33. In the motor 1 the field magnet 33 is arranged at a side of the stator 21 nearer to the central axis J1. When an electric current is conducted through the stator 21, a torque centered about the central axis J1 is generated between the stator 21 and the field magnet 33.

The bearing mechanism 4 as shown in FIG. 2 preferably includes an upper bearing 41 and a lower bearing 42 which are attached respectively at an upper portion and a lower portion of the rotor core 32 to the shaft 31, and a bearing holder 43 which is affixed to the housing 6 and in which the upper bearing 41 is accommodated. The lower bearing 42 is accommodated in an accommodation portion arranged at a bottom central portion of the housing 6 having a substantially cylindrical side wall.

Figure 8:
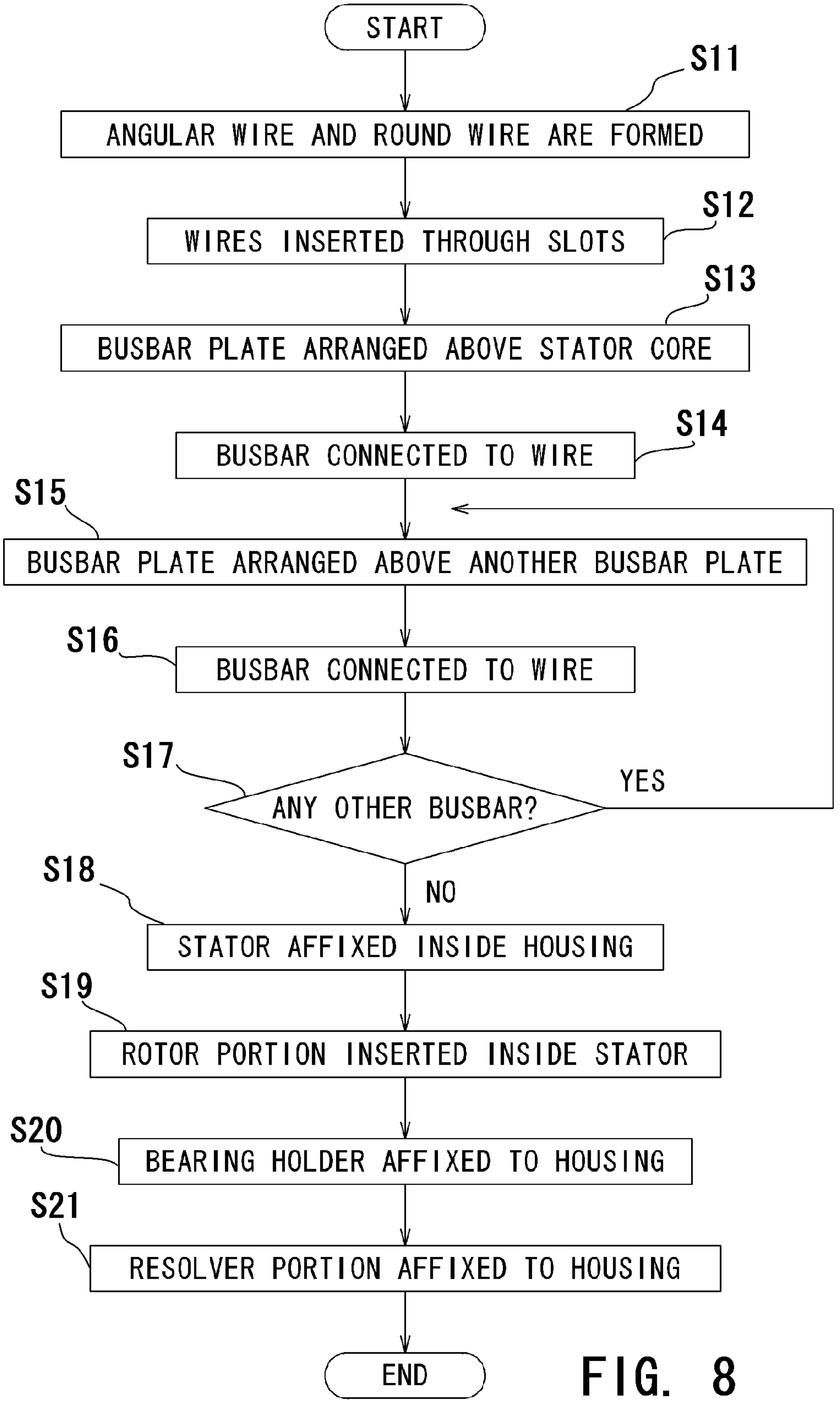
FIG. 8 is a flowchart illustrating a flow of steps of a manufacturing method of the motor according to a preferred embodiment of the present invention.
Figure 9A:
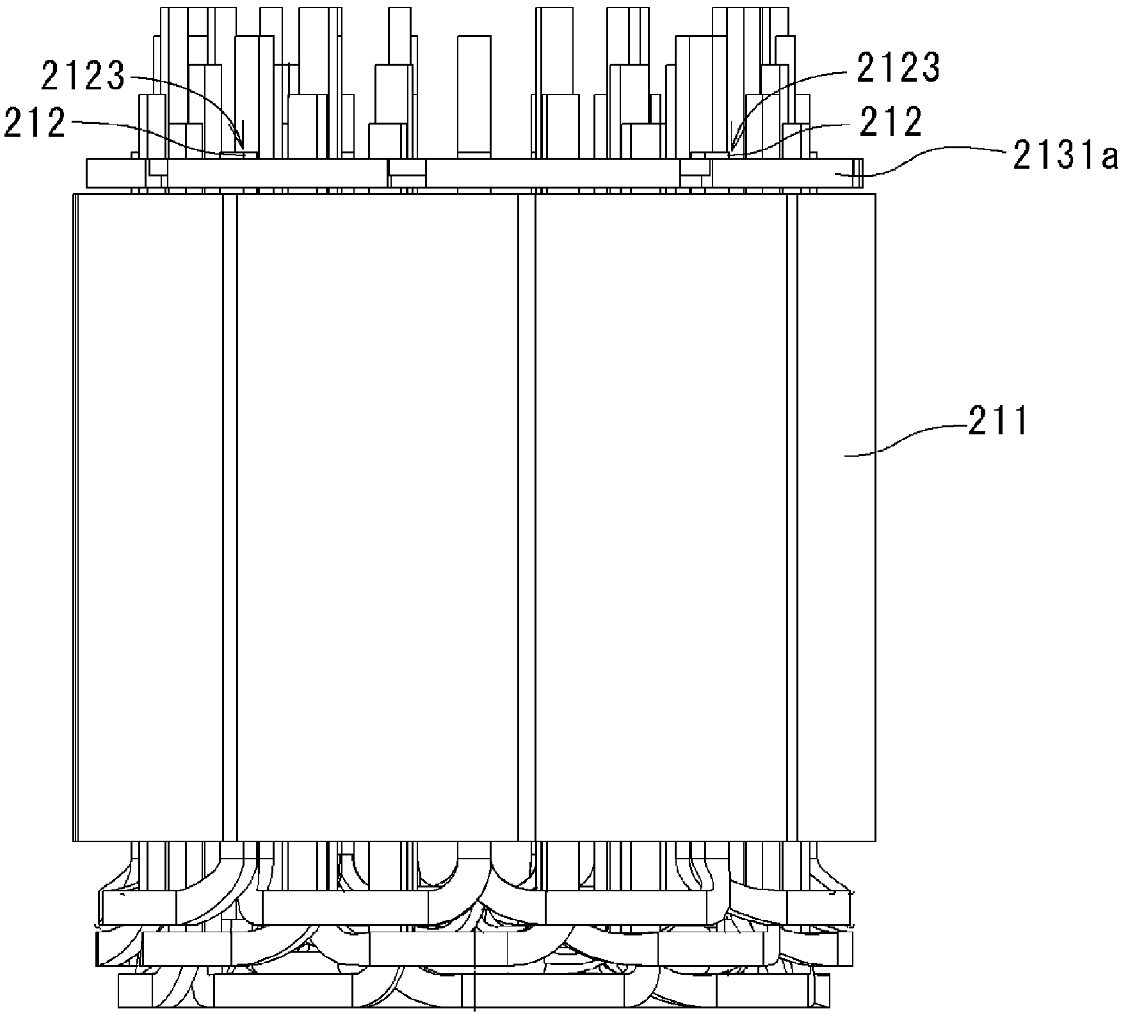
FIG. 9A is a schematic frontal view of the motor in the manufacturing process.
Figure 9B:
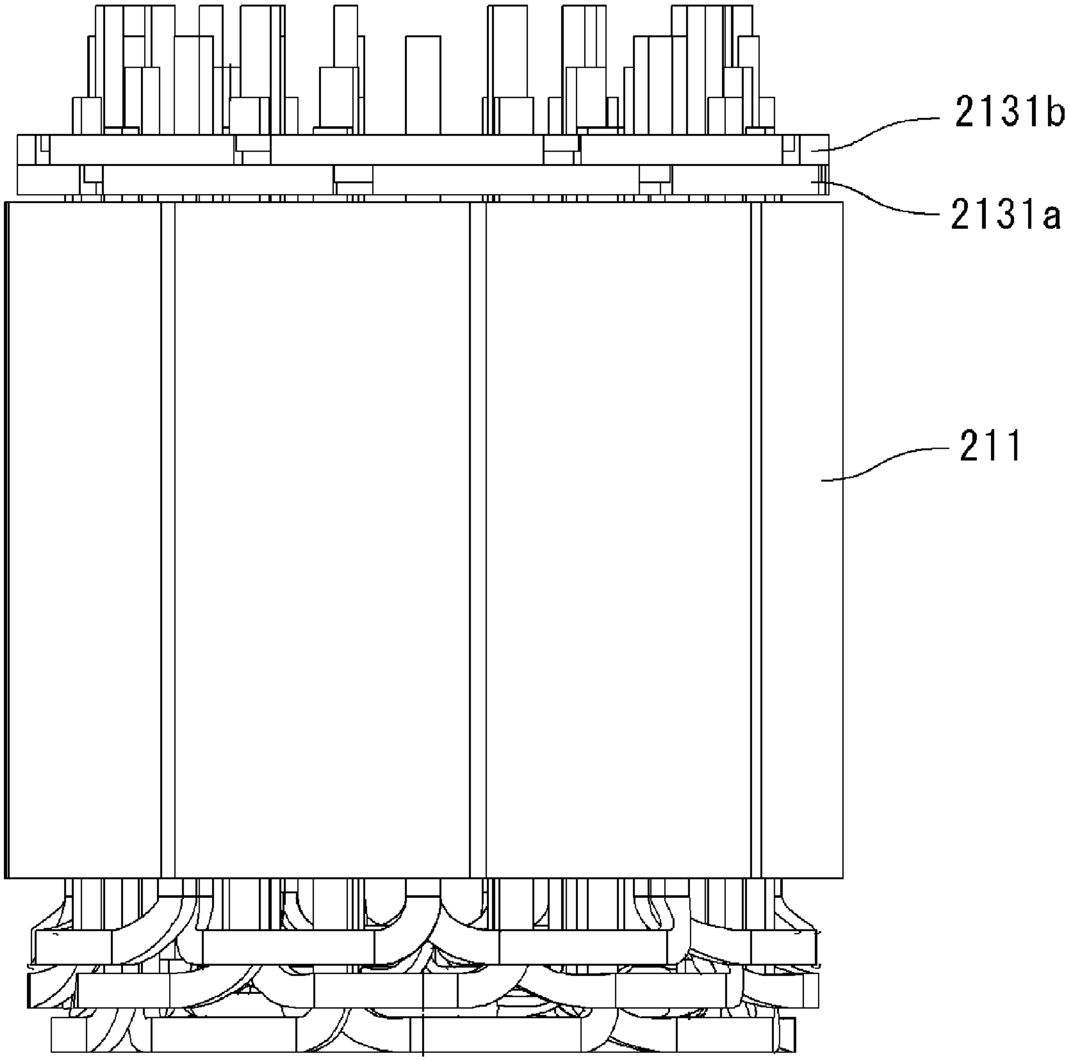
FIG. 9B is a schematic frontal view of the motor in the manufacturing process.
Figure 9C:
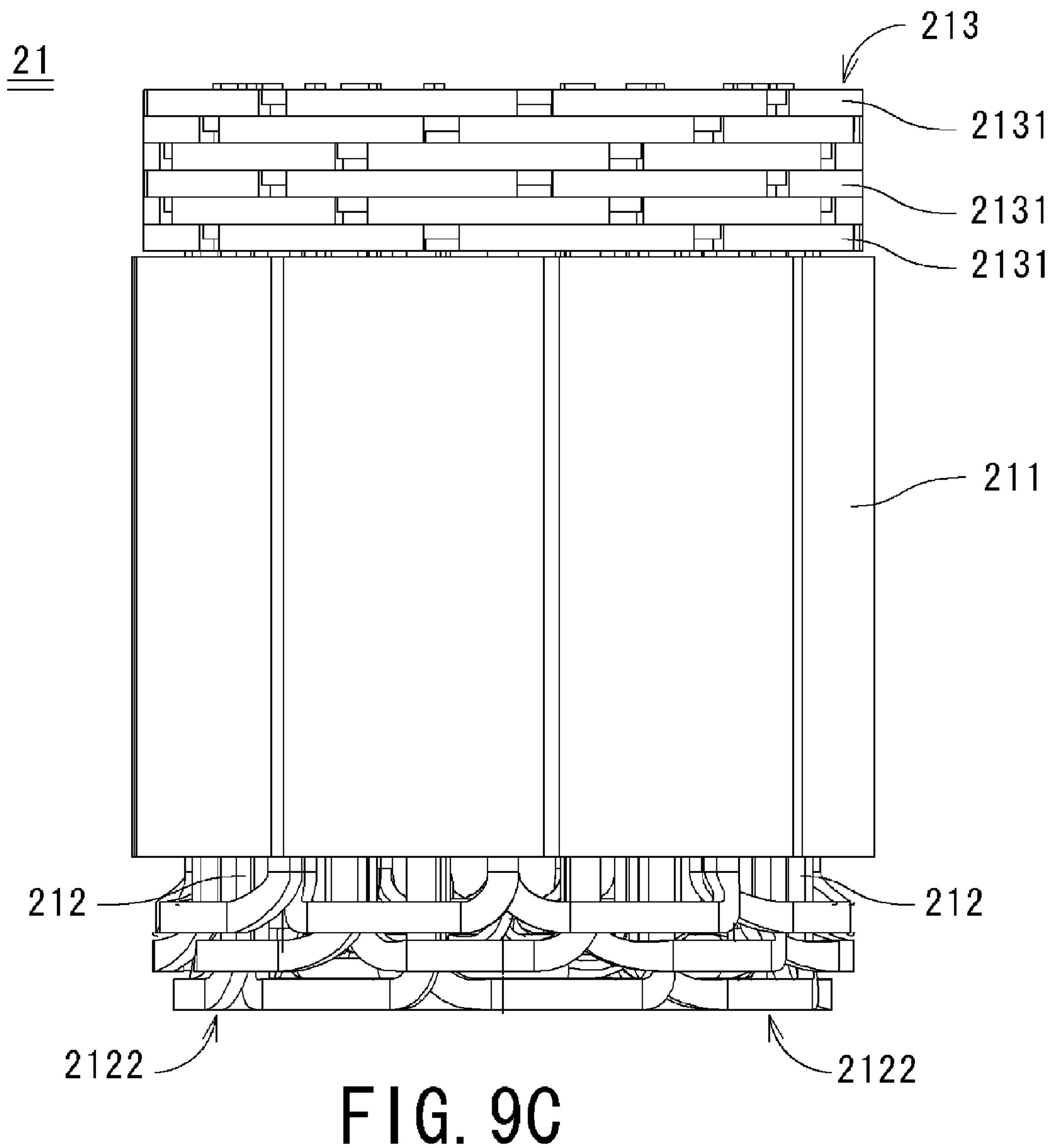
FIG. 9C is a schematic frontal view of the motor in the manufacturing process.
Figure 10A:
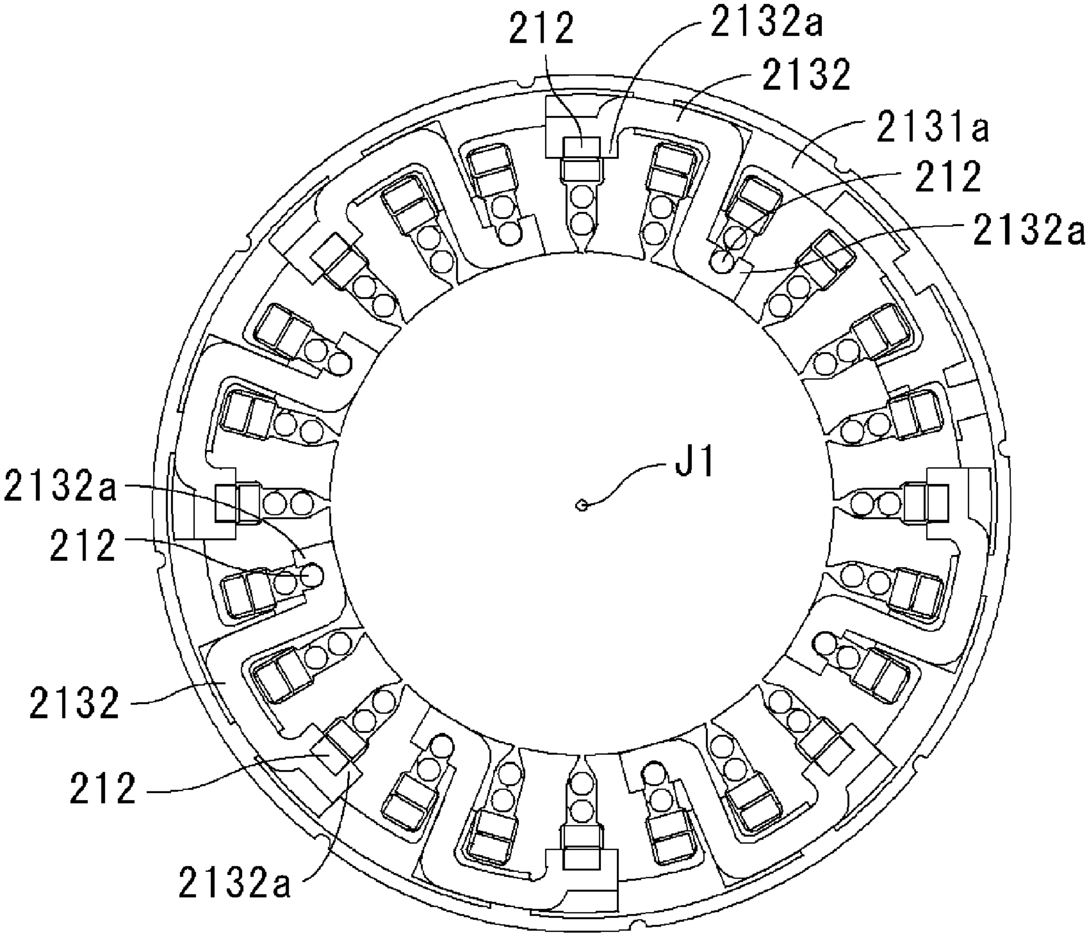
FIG. 10A is a schematic plan view of the motor in the manufacturing process.
Figure 10B:
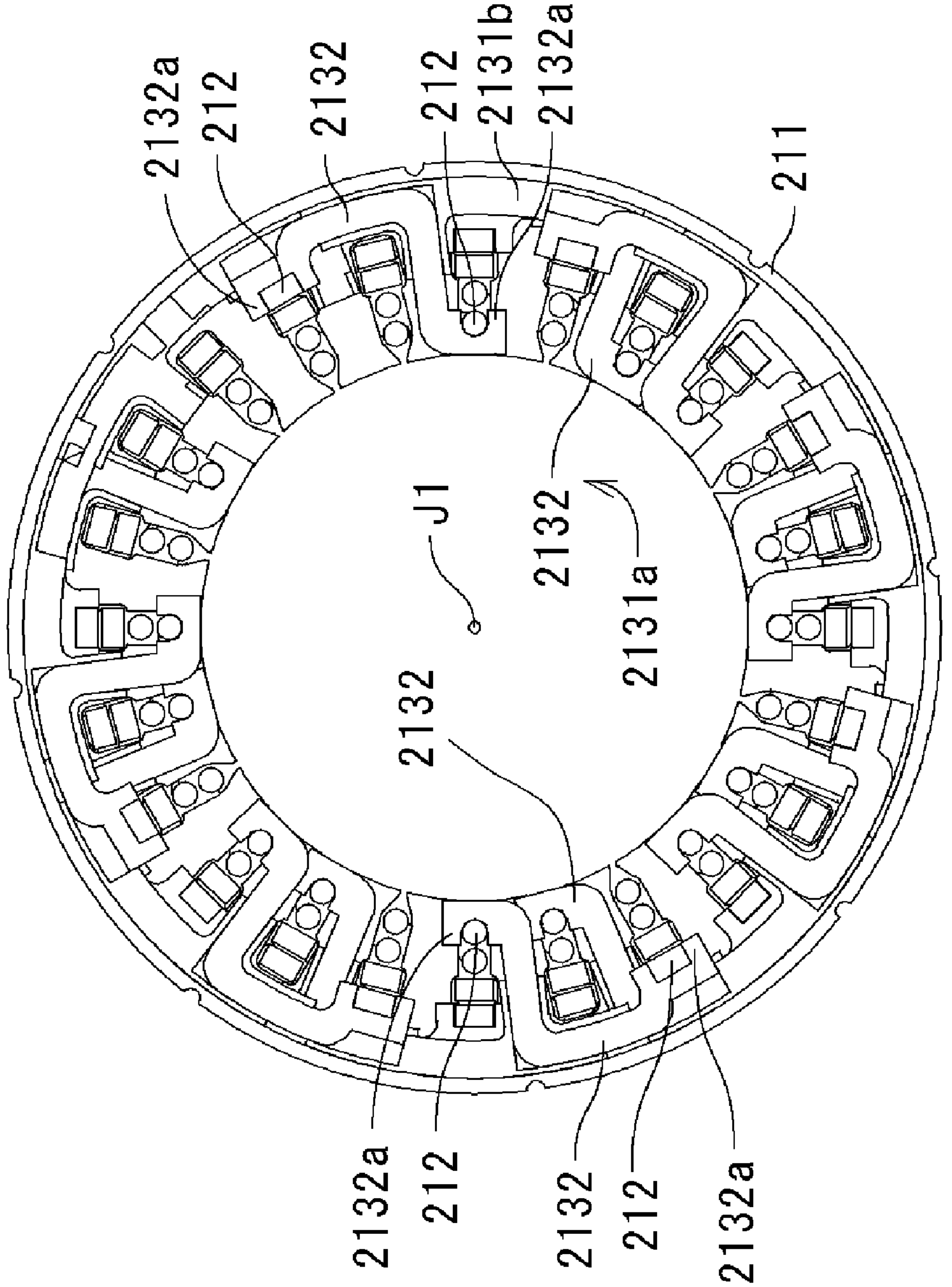
FIG. 10B is a schematic plan view of the motor in the manufacturing process.

Next, a manufacturing method of the motor 1 will be described with reference to FIGS. 8, 9A to 9C, 10A and 10C. FIG. 8 is a flowchart illustrating a flow of steps to manufacture the motor 1 according to the present preferred embodiment of the present invention. FIGS. 9A to 9C each show a schematic frontal view of the motor 1 while being manufactured. FIGS. 10A and 10B each show a schematic plan view of the motor 1 while being manufactured.

First, the angular wire 212*a* preferably having a substantially rectangular shape at a cross section thereof, and a pair of connecting endportions 2126 formed by cutting each end portion thereof is deformed at a substantially central portion thereof so as to form the approximately U-shaped configuration is formed. Also, the round wire 212*b* including a substantially round shape in cross section is deformed at a substantially central portion thereof so as to form the substantially U-shaped configuration is formed (step S11).

Next, after the angular wire 212*a* and the round wire 212*b* are formed, the insulator formed of an insulating material (e.g., resin, or the like) is inserted in the axial direction and attached to the stator core 211. By this, the side, upper and lower surfaces of the teeth 2111, and the upper and lower surfaces of the core back portion 2112 are coated with an insulating layer. Then, the straight portions 2121 of the wires 212 are inserted through the slots 2113 from the lower side of the stator core 211 (step S12). As a result, the end portions 2123 of the wires 212 will protrude above the top surface of the stator core 211 as shown in FIG. 4. Note that no insulating material (e.g., polyimide amide) is applied at the end portions 2123 of the wires 212 so that the end portions 2123 are connectable to the connecting portion 2132*a* of the busbar 2132.

Figure 7A:
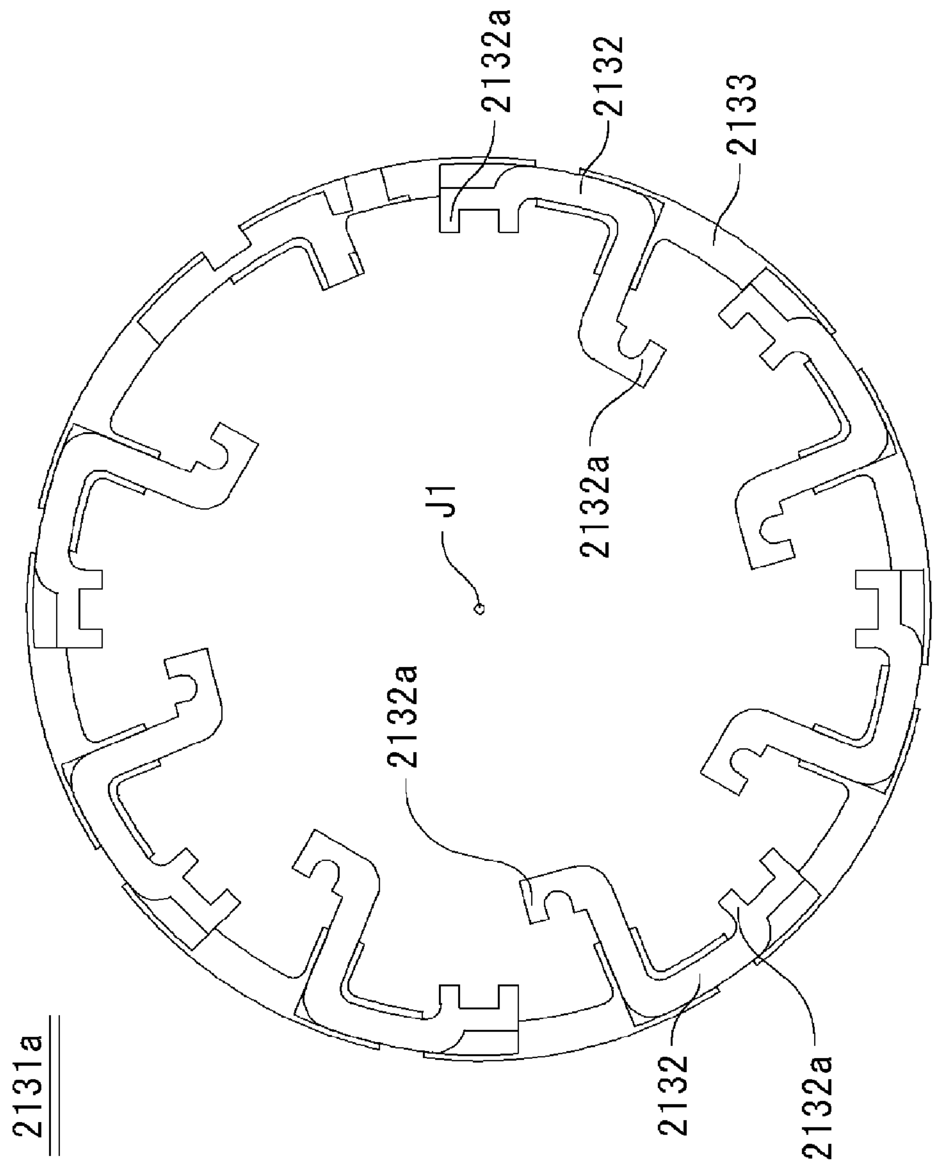
FIG. 7A is a schematic plan view of a busbar plate.

After the wires 212 are inserted through the slots 2113, the busbar plate 2131 as shown in FIG. 7A will be arranged above the stator core 211 as shown in FIG. 9A (step S13). Then, as shown in FIGS. 10A and 10B, the endportions 2123 will be fixed to corresponding connecting portions 2132*a*. Then, a TIG welding is carried out at the portion of the connecting portions 2132*a* connected to the end portions 2123 (step S14).

Figure 7B:
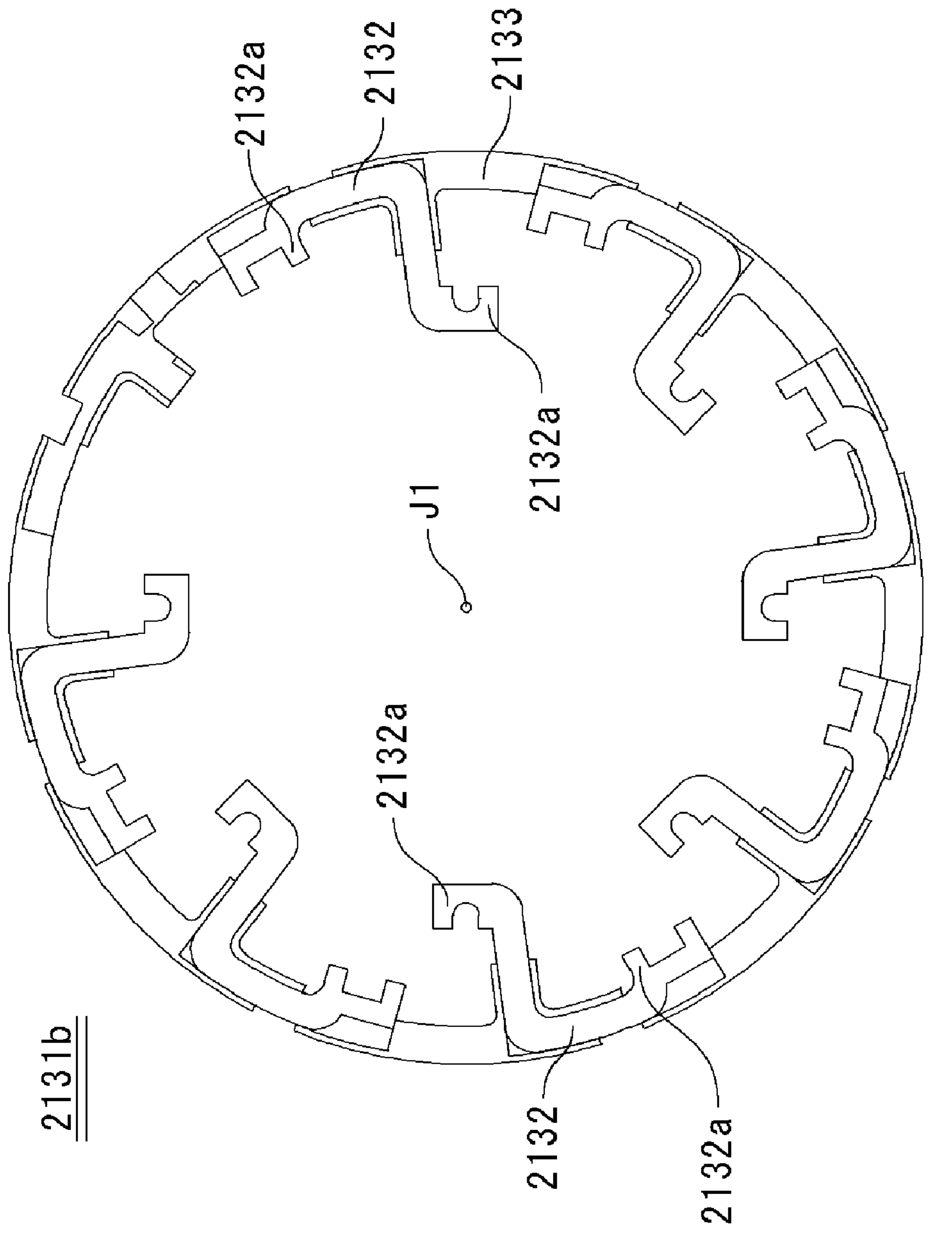
FIG. 7B is a schematic plan view of a busbar plate.
Figure 7C:
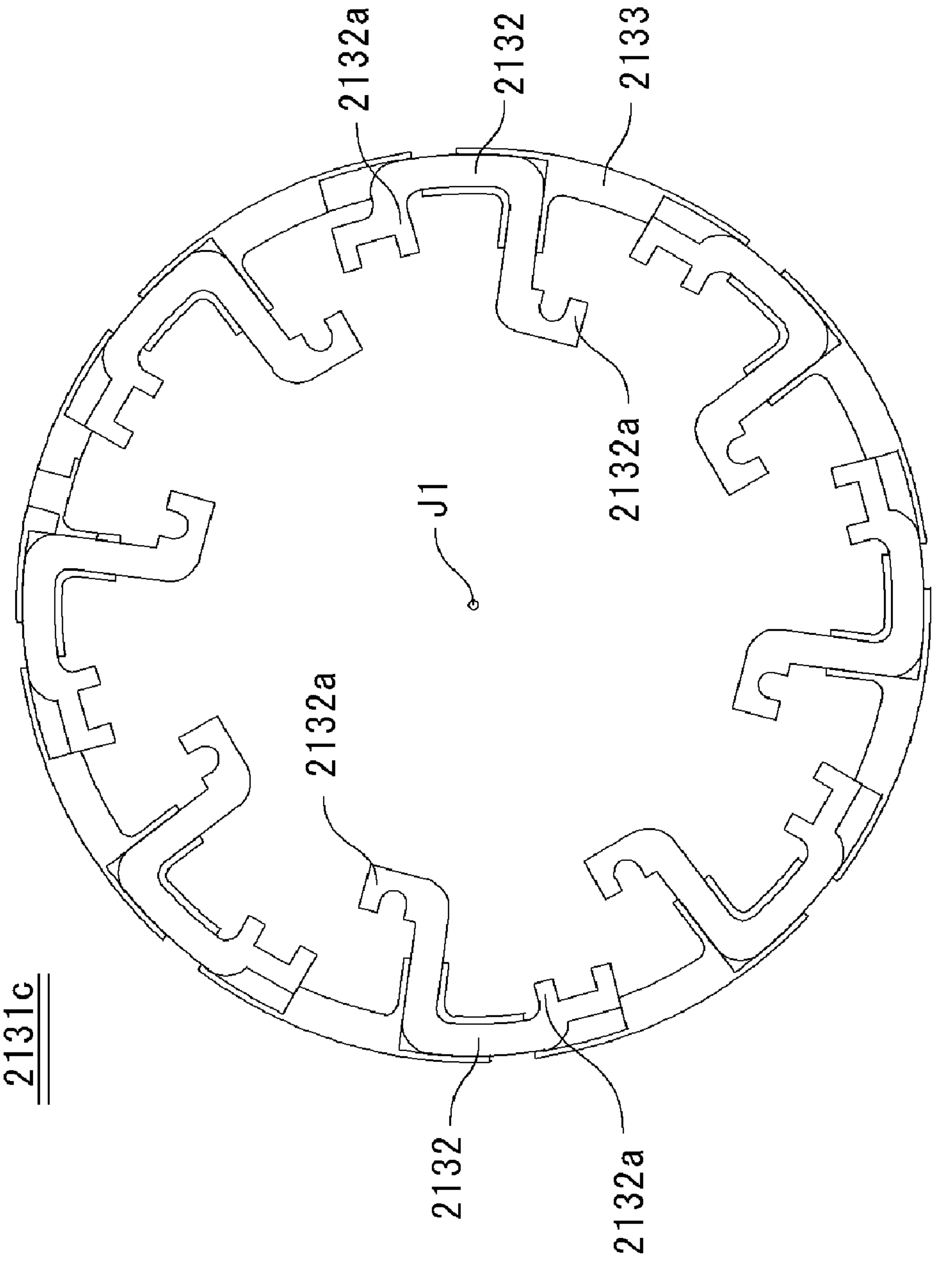
FIG. 7C is a schematic plan view of a busbar plate.
Figure 7D:
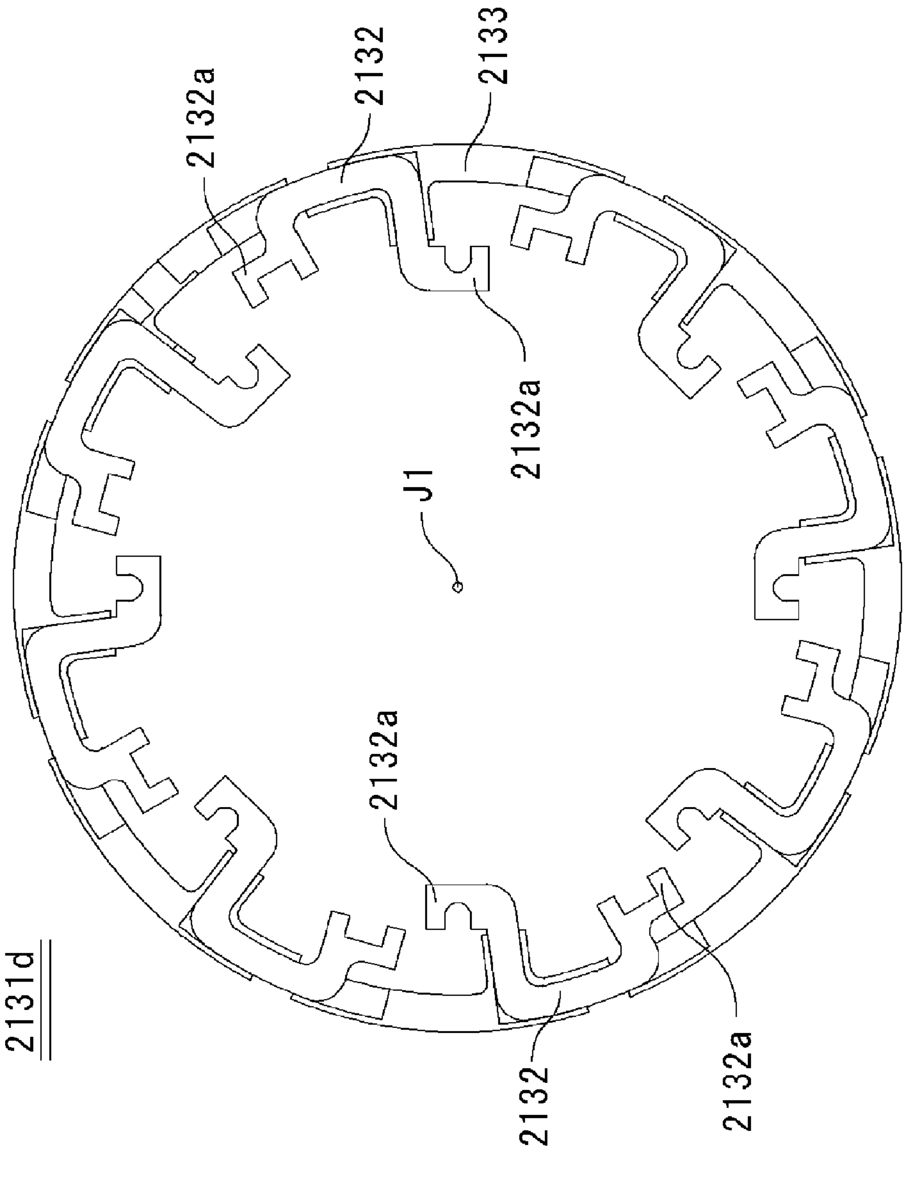
FIG. 7D is a schematic plan view of a busbar plate.
Figure 7E:
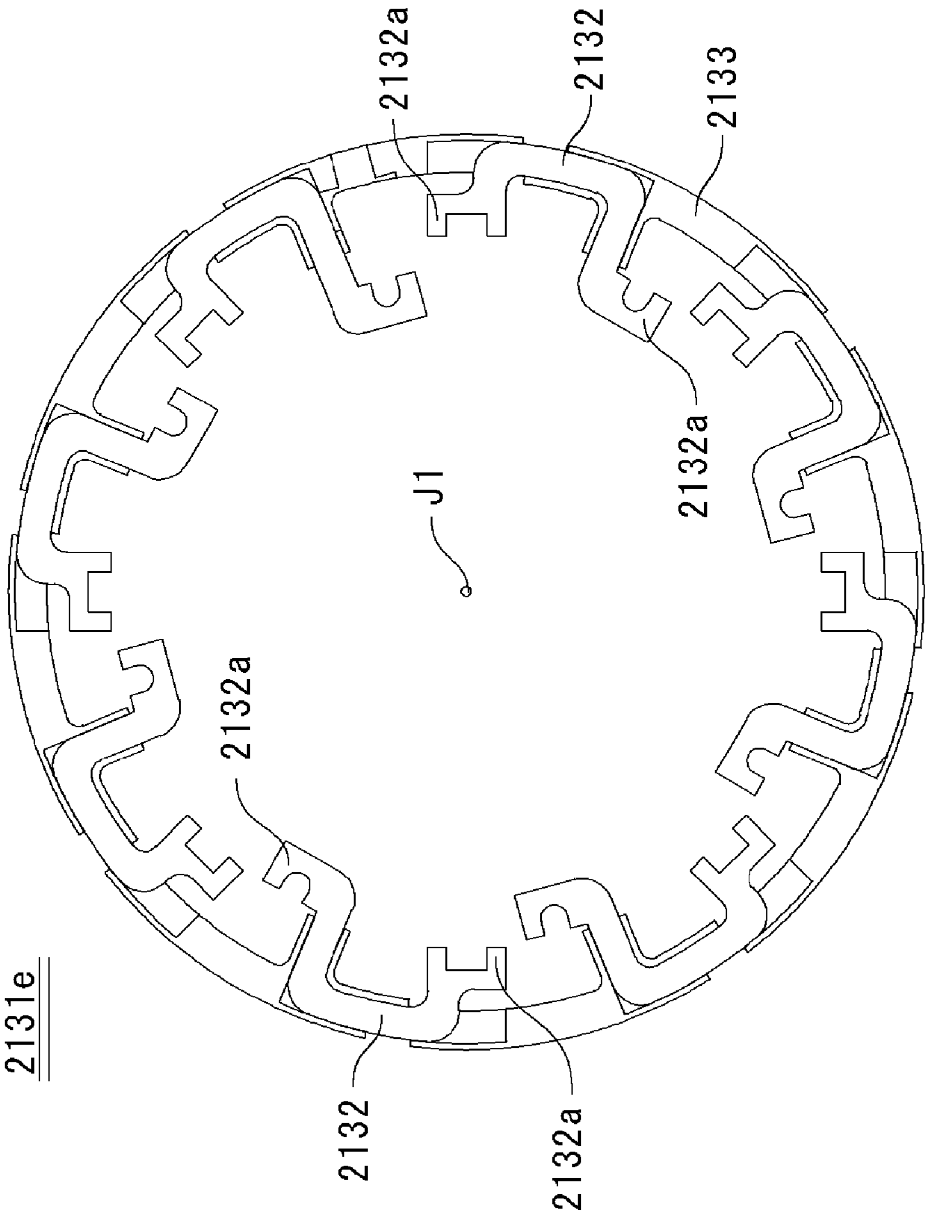
FIG. 7E is a schematic plan view of a busbar plate.
Figure 7F:
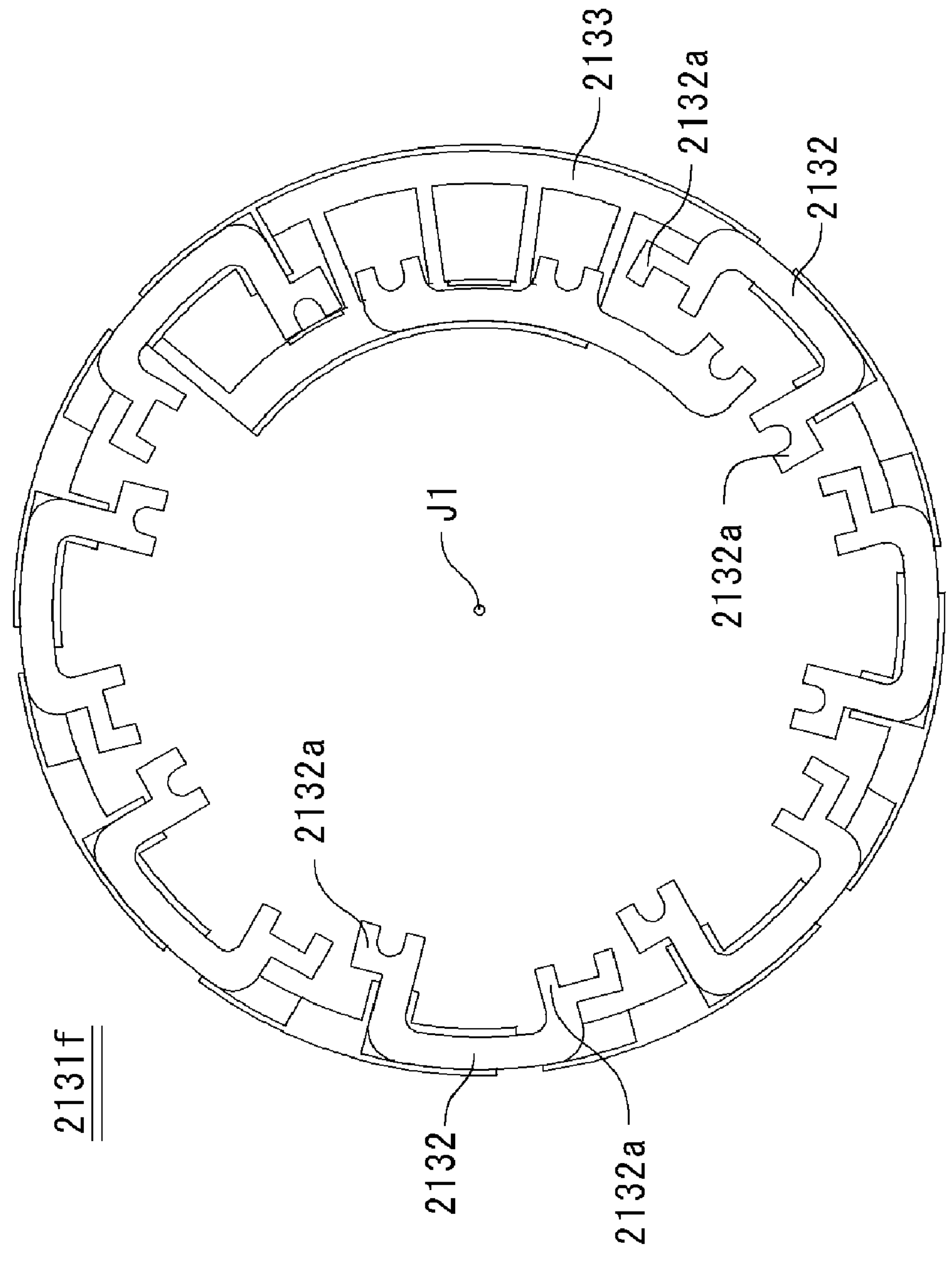
FIG. 7F is a schematic plan view of a busbar plate.

Next, the busbar plate 2131*b* as shown in FIG. 7B will be arranged above the busbar plate 2131*a* which is arranged above the stator core 211 as shown in FIG. 9B (step S15). As shown in FIG. 10B, portions of the wires 212 (that is, portions of the wires 212 connected to the busbar plate 2131*b*) will be fixed to the corresponding connecting portions 2132*a* of the busbar plate 2131*b*. The busbars 2132 of the busbar plate 2131*b* are arranged such that the busbars 2132 axially overlap with a portion of the busbars 2132 of the busbar plate 2131*a* at a side thereof opposite from the stator core 211 of the busbars 2132 of the busbar plate 2131*a*.

According to the motor 1 of the present preferred embodiment of the present invention, a second busbar plate is arranged above a first busbar plate and a plurality of second busbars overlap in the axial direction with a portion of a plurality of first busbar wherein the busbar plate 2131*a* and the plurality of busbars 2132 of the busbar plate 2131*a* make up the first busbar plate and the first busbar, and the busbar plate 2131*b* and the plurality of busbars 2132 of the busbar plate 2131*b* make up the second busbar plate and the second busbar.

At the busbar plate 2131*b*, the TIG welding is carried out, in the same manner as with the busbar plate 2131*a*, at the portion of the connecting portion 2132*a* connected to the end portion 2123 (step S16).

Hereafter, all the remaining busbar plates 2131 will be connected to the corresponding wires 212 (step S17). Then, the TIG welding to connect a portion of the wires 212 and the busbars 2132 of a busbar plate 2131 which is yet to be connected to the wires 212 and which is on top of another busbar plate 2131 already connected to the wires 212 is repeated (steps S15 to S17). Then, the stator 21 having the busbar unit 213 (that is, 6 busbar plates 2131 laminated on top of another above the stator core 211) as shown in FIG. 9*c* is formed. Note that in the busbar unit 213, the plurality of busbars 2132 of each busbar plate 2131 overlap in the axial direction with a portion of other busbars 2132.

Once all the busbar plates 2131 (for example, 6 in the present preferred embodiment) are connected to the corresponding wires 212 and the manufacturing of the stator 21 is complete, the stator 21 is inserted from the side of the connecting portion 2122 of the wire 212 to the housing 6 (see FIG. 2) which is heated, and the stator 21 is affixed to an inner portion of the housing 6 by shrink fitting (step S18). Next, a coil cover having a substantially annular shape is arranged inside the housing 6, and then, an upper side of the busbar unit 213 of the stator 21 is covered.

Next, the rotor portion 3, the upper bearing 41 and the lower bearing 42, both of which are attached to the shaft 31 of the rotor portion 3 are inserted into an inner side of the stator 21 inside the housing 6 (step S19). Note that an assembly of the rotor portion 3 and attaching the upper bearing 41 and the lower bearing 42 to the shaft 31 may be carried out independently of the above-described assembly of the stator 21 (steps S12 to S17).

After the rotor portion 3 is inserted into the stator 21, the bearing holder 43 is affixed to the housing 6 at an opening side thereof (step S20). Then, the resolver portion 5 is affixed to the housing 6 above the bearing holder 43 (step S21) to complete the manufacturing of the motor 1.

As described above, one busbar plate 2131 is connected to a portion of the plurality of wires 212, and a portion of the plurality of wires 212 is connected to the busbar plate 2131*b* which is arranged above the busbar plate 2131*a* in the stator 21 of the motor 1 according to the present preferred embodiment of the present invention. Then, one busbar plate 2131 is arranged above another busbar plate 2131 (i.e., the busbar plate 2131*f* above the busbar plate 2131*e*, the busbar plate 2131*e* above the busbar plate 2131*d* and so on) to which a portion of the plurality of wires 212 are sequentially connected so as to form the coil 214.

As described above, according to the present preferred embodiment of the present invention, the wires 212 are connected to the plurality of busbars 2132 which are temporarily retained by the busbar plate 2131 in order to facilitate the forming of coils 214. By virtue of such configuration, the motor 1 according to the present preferred embodiment of the present invention is manufactured more effectively compared with a manufacturing method in which each independent busbar is connected to a wire.

Also, since the plurality of wires 212 are connected to the plurality of laminated busbar plates 2131, a number of connecting portions 2132*a* required for the busbar 2132 of each busbar plate 2131 is reduced. By virtue of such configuration, while a gap at the connecting portion 2132*a* for the connecting operation of the wire 212 and the busbar 2132 is appropriately maintained, the diameter of the busbar plate 2131 is unexpanded, and therefore, a dimension of the motor 1 may be unexpanded.

A motor used in a compressor for an air conditioner or the like in a motor vehicle is expected to meet a demand for reduction of cost for manufacture, reduction of dimension, more efficiency. The motor 1 according to the present preferred embodiment of the present invention, as described above, may be manufactured simply while the dimension thereof is not enlarged. Therefore, the motor 1 according to the present preferred embodiment of the present invention is particularly suitable for use in the compressor for the air conditioner or the like in a motor vehicle. Also, from a view point of improving safety and reduction of heat demagnetization, an IPM (Interior Permanent Magnet) motor in which a permanent magnet is embedded at a rotor core inside a stator is used in the compressor for the air conditioner or the like in a motor vehicle. The present invention is also suitable for the IPM motor.

By virtue of the manufacturing method as described above, the connection between the stator 21 and the plurality of wires 212 will be carried out smoothly while increases in the dimensions of the busbar plate 2131 is minimized. Also, since the present manufacturing method allows the connecting operation between the wires 212 and the busbar 2132 to be carried out from the upper side of the stator core 211, the connecting will be carried out efficiently.

Further, since the plurality of busbars 2132 of one busbar plate 2131 are arranged in the overlapping manner in the axial direction with the plurality of busbars 2132 of another busbar plate 2131, the degree of design freedom related to the circumferential positions of the busbars 2132 is improved. Consequently, a gap having an appropriate space between the connecting portions 2132*a* of the busbar 2132 will be secured allowing effective connecting operation of the wires 212.

According to the present preferred embodiment of the present invention, since the connecting portions 2132*a* of the busbars 2132 of each busbar plate 2131 of the stator 21 are arranged nearer to the central axis J1 than the outer circumferential rim of the stator core 211, the diameter of the busbar unit 213 will not be greater than the diameter of the stator core 211. Therefore, the dimension of the motor 1 will be minimized.

Since the plurality of busbars 2132 are arranged inwardly of the outer circumferential edge of the busbar holder 2133, the connecting portions between the wires 212 and the busbars 2132 will not be exposed outwardly of the busbar holder 2133. By virtue of such configuration, the reliability of the connection between the busbars 2132 and the wires 212 is improved. Also, since the busbars 2132 and the wires 212 are welded together, the connection therebetween is strong which improves the reliability of the stator 21 and that of the motor 1.

Since the approximately U-shaped wire 212 having two straight portions 2121 is used to form the coils 214 according to the motor 1 of the present preferred embodiment of the present invention, the number of the connecting steps for connecting the busbar 2132 and the wire 212 is, compared with the coil formed by using a straight wire, reduced. Also, by virtue of such configuration, the wire 212 prior to being connected to the busbar 2132 may be retained within the slot 2113 easily, and therefore, the manufacturing of the motor 1 is carried out effectively.

Also, the configuration of the stator 21 including the coils 214 in which the wires 212 are connected to the plurality of busbar plates 2131 is particularly suitable when forming a coil 214 by using a wire (for example, a round wire whose diameter is smaller than about 3.16 mm, or an angular wire whose cross section is greater than about 12.3 $mm^2$, for example, or other suitable dimensions) which makes it difficult to wind around teeth.

Figure 11:
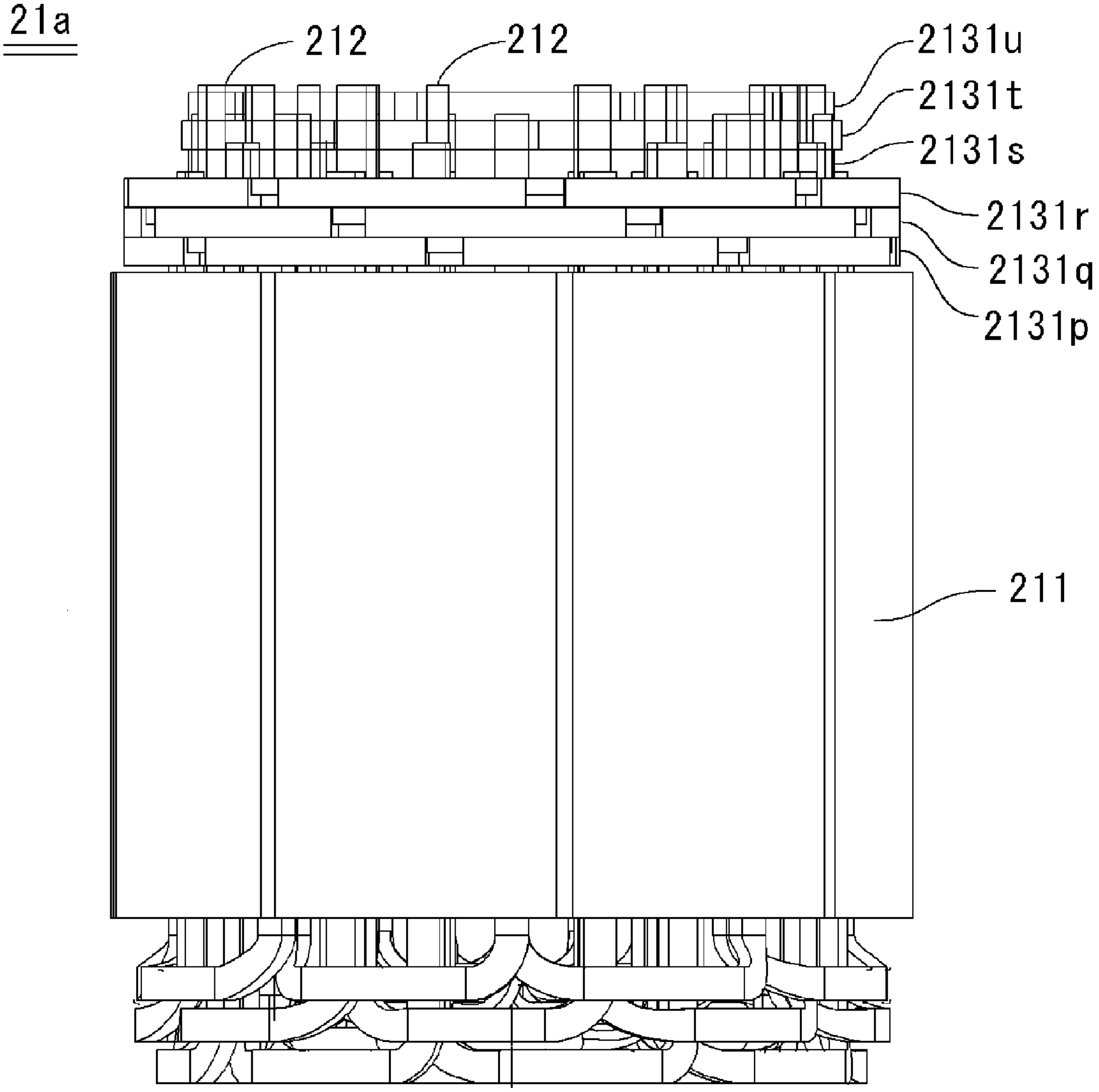
FIG. 11 is a schematic frontal view of a stator of a motor according to a second preferred embodiment of the present invention.

Hereinafter, a second preferred embodiment of the present invention will be described. FIG. 11 is a schematic frontal view of a stator 21*a* of a motor according to the second preferred embodiment of the present invention. As shown in FIG. 11, the stator 21*a* preferably includes 6, for example, busbar plates 2131 (referred to as busbar plate 2131*p* to busbar plate 2131*u* instead of busbar plate 2131*a* to busbar plate 2131*f* according to the first preferred embodiment) laminated on top of another. Other than the aforementioned difference, the motor 1 according to the first preferred embodiment is identical with the motor according to the second preferred embodiment, and therefore elements of the second preferred embodiment similar to those illustrated for the first preferred embodiment are denoted by similar reference numerals, and description thereof is omitted. Also, the manufacturing method of the motor according to the second preferred embodiment is identical with that of the first preferred embodiment.

Figure 12A:
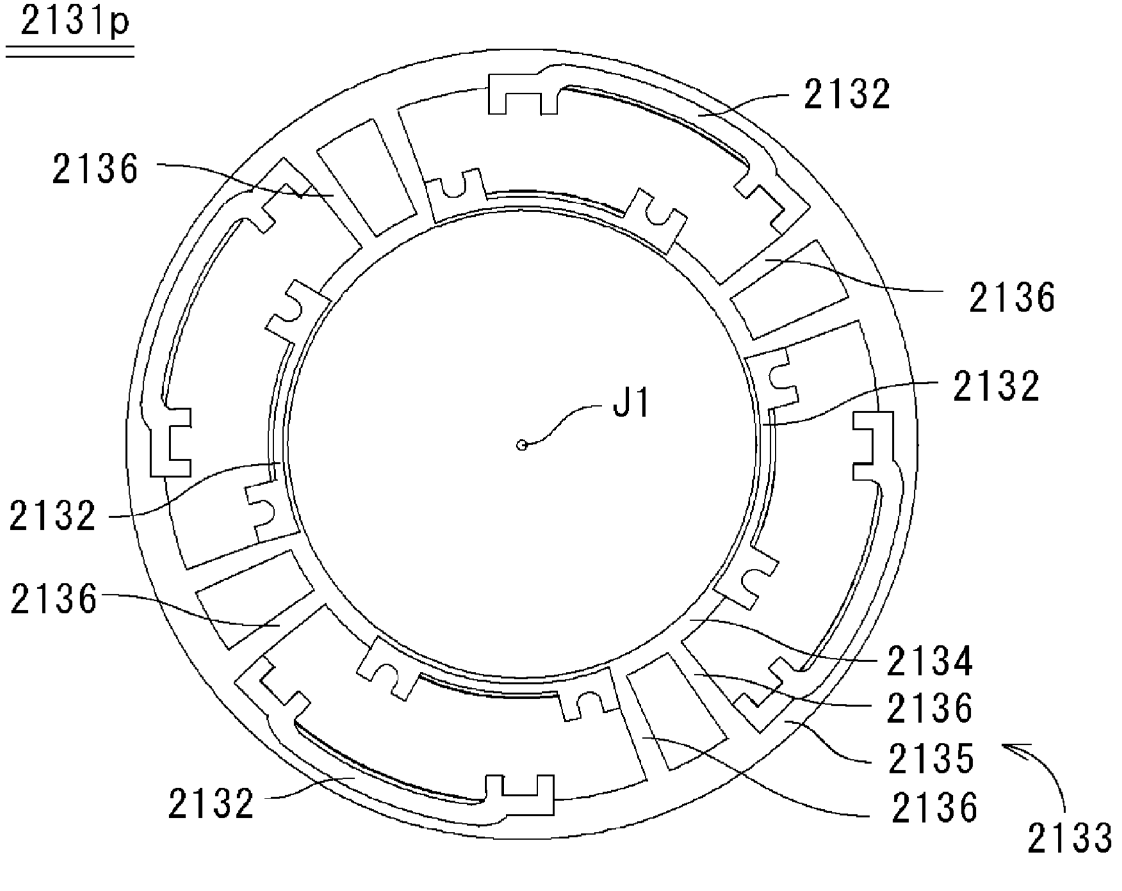
FIG. 12A is a schematic plan view of a busbar plate.
Figure 12B:
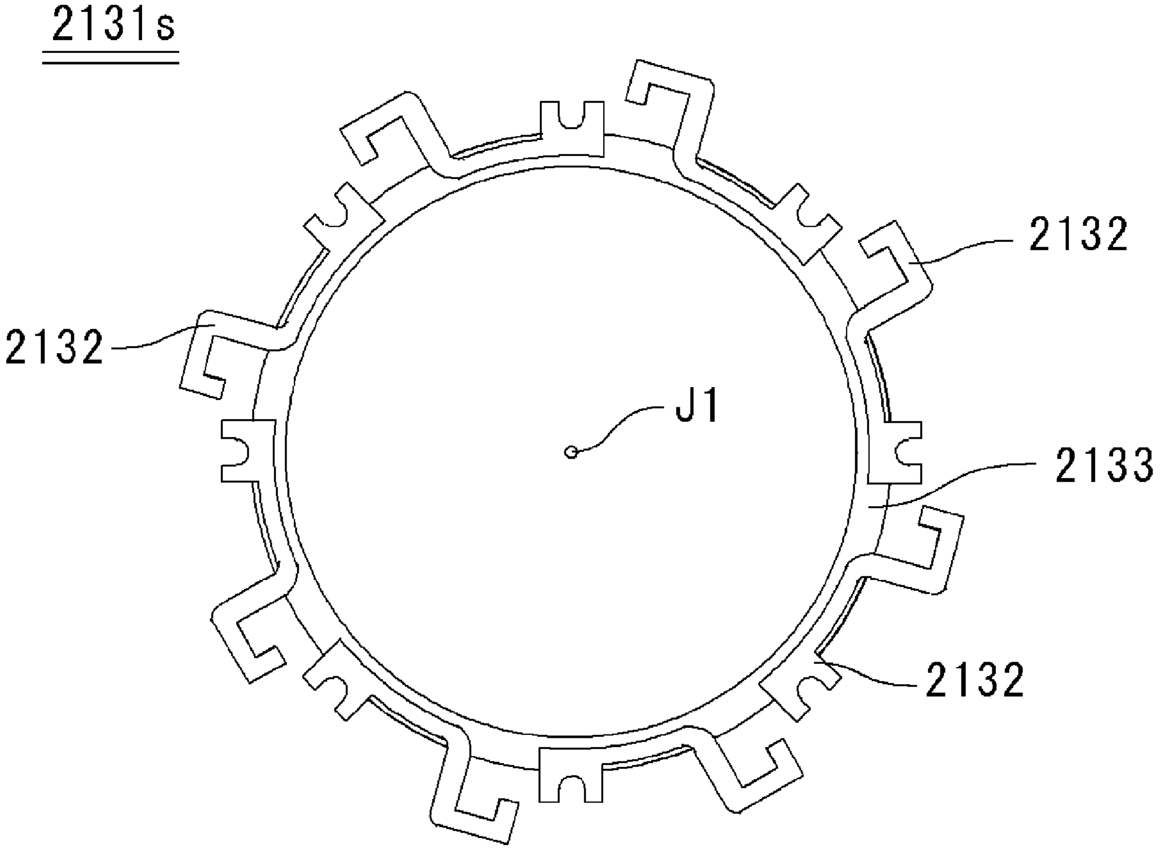
FIG. 12B is a schematic plan view of a busbar plate.

FIG. 12A and FIG. 12B each respectively show a schematic plan view of the busbar plate 2131*p* and the busbar plate 2131*s* (i.e., the first and fourth layer of the busbar plate 2131). Note that according to the stator 21*a* of the present preferred embodiment, the busbar plate 2131*q* and the busbar plate 2131*r* (i.e., the second and the third layer) are all but identical to the first layer; and the busbar plate 2131*t* and the busbar plate 2131*u* are all but identical to the fourth layer.

As shown in FIG. 12A, the busbar plates 2131*p*, 2131*q* and 2131*r* each preferably include a plurality (for example, 8 in the present preferred embodiment) of busbars 2132 arranged so as to be spaced evenly apart from one another in the circumferential direction at a same position in the axial direction, and a busbar holder 2133 which is a terminal retainer of insulating quality (e.g., resin material) having a substantially annular shape centered about the central axis J1 and to which the plurality of busbars 2132 are integrally affixed. The busbar holder 2133 preferably includes an inner side retaining portion 2134 having a substantially arc shape, an outer side retaining portion 2135 having a substantially arc shape arranged outwardly of the inner side retaining portion 2134, and a connecting portion 2136 which is arranged in a concentric manner with the inner side retaining portion 2134 and the outer side retaining portion 2135 so as to connect the inner side retaining portion 2134 and the outer side retaining portion 2135.

The inner side retaining portion 2134 preferably retains a portion of the plurality (for example, 4 in the present preferred embodiment) of busbars 2132 at a side (opposite side from the central axis J1) radially opposite from the outer side retaining portion 2135. The outer side retaining portion 2135 preferably retains a plurality of busbars 2132 not retained by the inner side retaining portion 2134 at a side radially opposite from the inner side retaining portion 2134. According to the stator 21*a* of the present preferred embodiment, the outer side retaining portion 2135 includes a portion overlapping in the radial direction centered about the central axis J1 the inner side retaining portion 2134.

As shown in FIG. 12B, the busbar plates 2131*s*, busbar plate 2131*t*, busbar plate 2131*u* each preferably include a plurality (for example, 8 in the present preferred embodiment) of busbars 2132 arranged so as to be spaced evenly apart from one another in the circumferential direction at a same position in the axial direction, the busbar holder 2133 which is a terminal retainer of insulating quality and to which the plurality of busbars 2132 are integrally affixed. Note that as shown in FIG. 11 the busbar plates 2131*s*, busbar plate 2131*t*, busbar plate 2131*u* are layered on top of the busbar plates 2131*p* to 2131*r*. The wires 212 connected to the busbar plates 2131*s* to 2131*u* travel through a space between the inner side retaining portion 2134 and the outer side retaining portion of the busbar plates 2131*p* to 2131*r*. According to the stator 21*a* of the present preferred embodiment of the present invention, the second busbar plates is arranged above the plurality of first busbar plates, and the wires 212 connected to the second busbar plate travel through the space between the inner side retaining portion 2134 and the outer side retaining portion of the first busbar plate, wherein the busbar plates 2131*p* to 2131*r* make up collectively the first busbar plate, and the busbar plates 2131*s* to busbar plate 2131*u* make up collectively a second busbar plate.

As with the first preferred embodiment, the stator 21*a* includes at the stator core 211 the plurality of busbar plates 2131 (2131*p* to 2131*u*) layered on top of another. Also, the plurality of wires 212 are connected to each busbar plate 2131 in a sequential manner so as to form the coils 214 in the same manner as described for the first preferred embodiment. By virtue of such configuration, the connections between the plurality of wires 212 and the busbar 2132 are carried out more effectively while the dimension of the motor remains without being expanded.

According to the stator 21*a* of the present preferred embodiment of the present invention, the inner side retaining portion 2134 and the outer side retaining portion 2135 of each of busbar plates 2131*p* to 2131*r* are arranged circumferentially centered about the central axis J1, the plurality of busbars 2132 are allowed to be arranged circumferentially centered about the central axis J1 in a space efficient manner. By virtue of such configuration, the motor according to the present preferred embodiment of the present invention is effective to minimize any increase in dimension thereof. Note that, as for the busbar plates 2131*p* to 2131*r*, at least one of the inner side retaining portion 2134 and the outer side retaining portion may include a substantially arc shape when the outer side retaining portion 2135 overlaps in the axial direction with at least a portion of the inner side retaining portion 2134.

Figure 13:
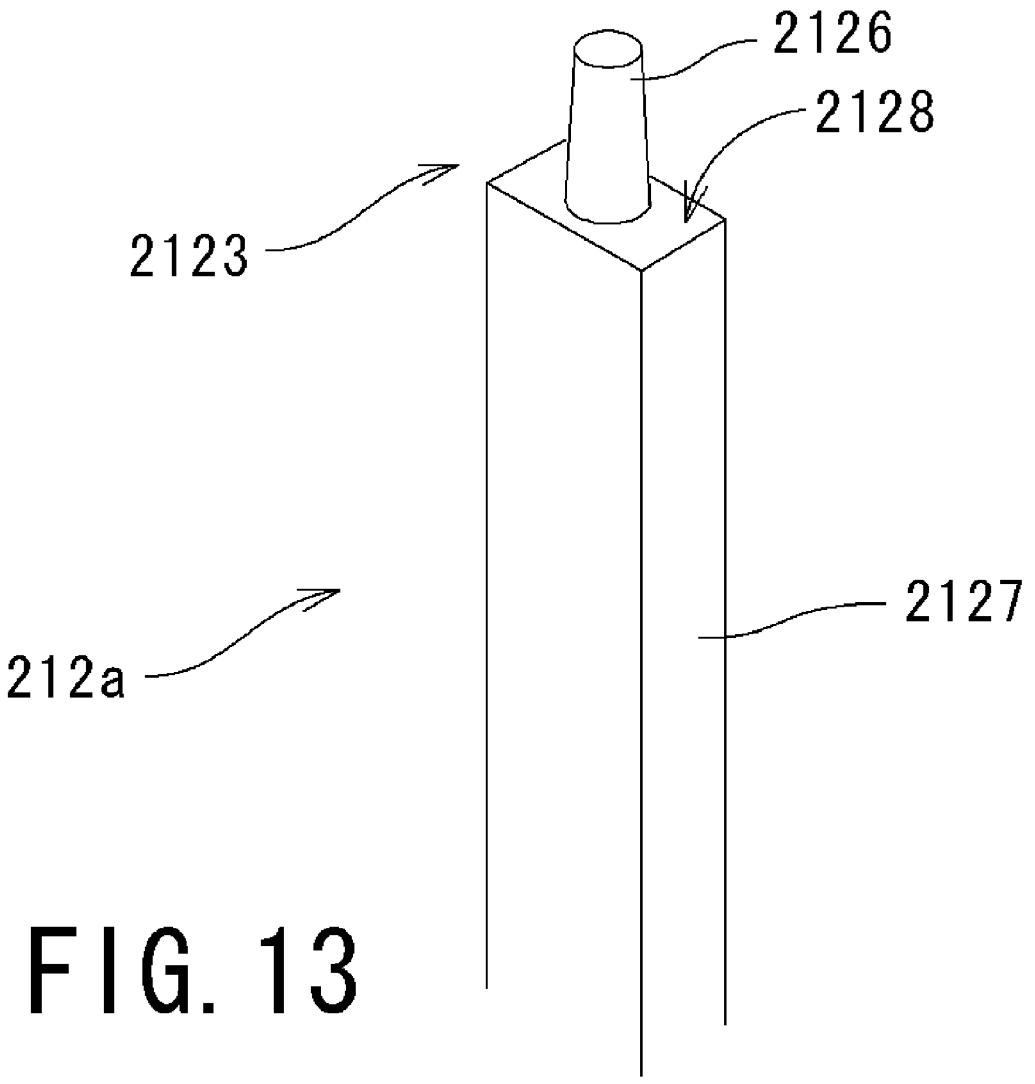
FIG. 13 is an enlarged view of a portion of the angular wire.

Hereinafter, a third preferred embodiment of the present invention will be described. FIG. 13 is a schematic perspective view of one of the end portions 2123 of the angular wire 212*a* having a configuration different from those of the first and second preferred embodiments.

As shown in FIG. 13, each end portion 2123 of the angular wire 212*a* according to the third preferred embodiment preferably includes the connecting end portion 2126 having a substantially columnar shape with an exposed conductive material wherein the diameter thereof is reduced toward the end. The connecting end portion 2126 is preferably TIG welded to the busbar 2132 of each busbar plate 2131.

Also, the angular wire 212*a* preferably includes a line portion 2127 whose side surface is covered by an insulating layer. The connecting end portion 2126 preferably protrudes, as shown in FIG. 13, out of the end surface 2128 of the angular wire 212*a* in a continuous manner.

The connecting end portion 2126 has a columnar shape wherein a diameter thereof at the end surface 2128 is greater than a diameter thereof at a portion of the connecting end portion 2126 furthest away from the end surface 2128. The connecting end portion 2126 is formed by removing an insulating layer coated on the side of the end portion.

As shown in FIG. 13, when the motor 1 is manufactured by using the angular wire 212*a*, 6 busbar plates 2131, for example, are arranged above the stator core 211 in the similar manner to the first preferred embodiment. Then a portion of the plurality of the wires 212 is connected to each busbar plate 2131 in a sequential manner so as to form the coils 214. By virtue of such configuration, the dimension of the motor 1 will be kept to a minimum while the connecting process between the wires 212 and the busbars 2132 will be carried out effectively.

Figure 14:
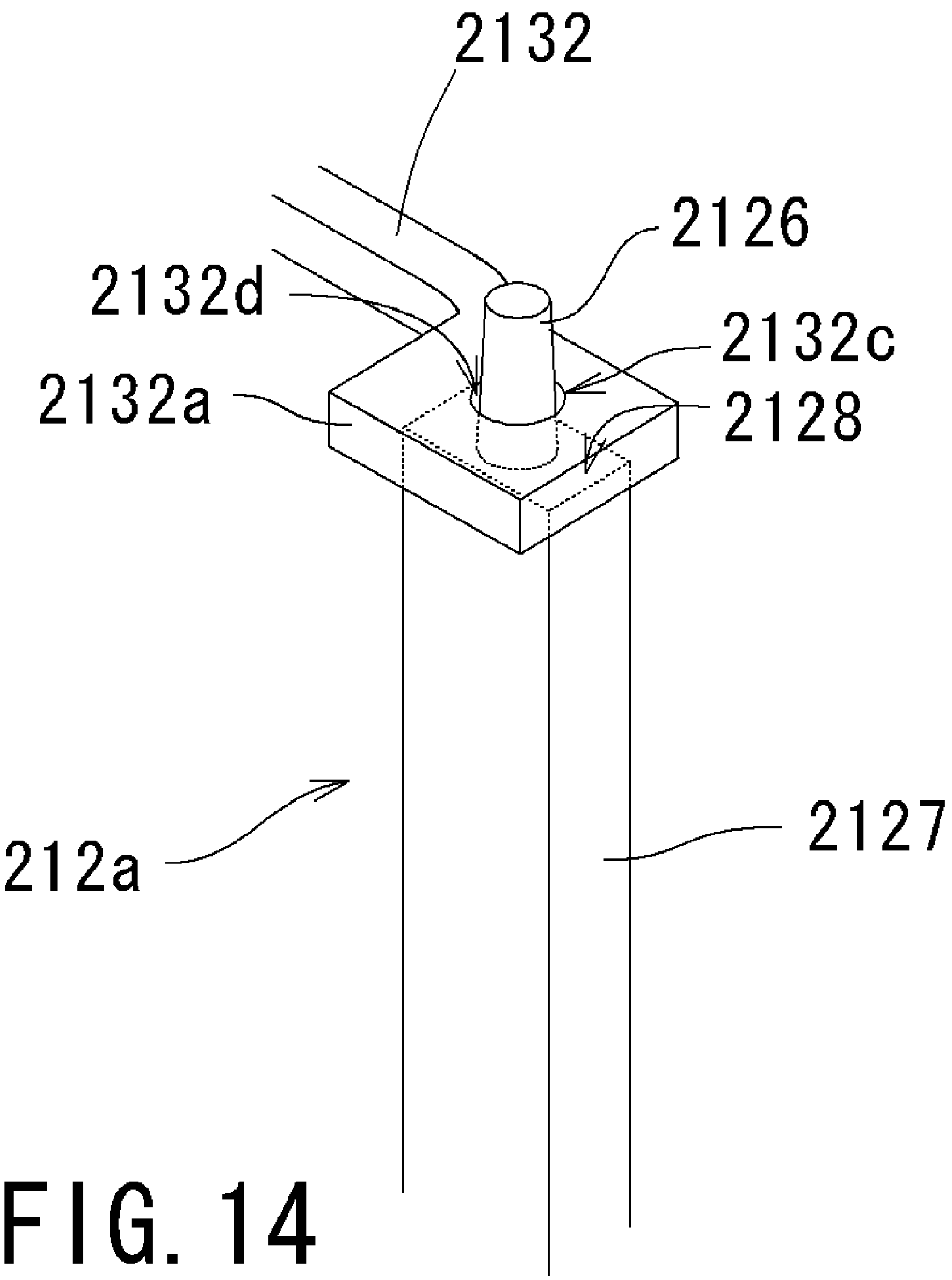
FIG. 14 is a schematic perspective view of the angular wire and the busbar.

When the angular wire 212*a* and the busbar 2132 are connected to each other according to the present preferred embodiment of the present invention, the connecting end portion 2126 of the angular wire 212*a* is fitted in an inserting manner at a notched portion 2132*b* arranged at the connecting portion 2132*a* of the busbar 2132 as shown in FIG. 14. Then, the TIG welding is carried out between the connecting end portion 2126 of the angular wire 212*a* and the connecting portion 2132*a* of the busbar 2132 while the connecting portion 2132*a* is connected to the side of the end surface 2128 and the connecting end portion 2126.

As described above, since the busbar 2132 and the end surface 2128 of the line portion 2127 are connected to one another prior to when the angular wire 212*a* and the busbar 2132 are welded to one another, a relative positioning of the busbar 2132 with respect to the angular wire 212*a* is determined effectively and the TIG welding is carried out with facility. Also, when arranging the connecting end portion 2126 at the slots 2113 of the stator core 211 and arranging the connecting end portion 2126 at the notched portions 2132*b* of the busbar 2132, no obstacle (e.g., the stator core 211 and the busbar 2132 or the like) will be in the way of the connecting end portion 2126, and therefore, handling the wires 212, in particular the angular wire 212*a*, will be facilitated.

Also, since a gap will be generated between the connecting end portion 2126 of the angular wire 212*a* and the notched portion 2132*b* of the connecting end portion 2126, a welding material (e.g., welding rod or a portion of the connecting end portion 2126 or the like) will be filled therein which further secures the connection between the connecting end portion 2126 and the notched portion 2132*b*.

According to the motor 1 of the present preferred embodiment, since the angular wire 212*a* has the substantially U-shaped configuration including two straight portions 2121 and the connecting portion 2122, the angular wire 212*a* prior to being welded to the busbar 2132 may be retained by the slots 2113 of the stator core 211 which also facilitate the handling of the angular wires 212*a*.

According to the angular wire 212*a* of the present preferred embodiment of the present invention, since the side surface of the line portion 2127 is coated with the insulating material while the side surface of the connecting end portion 2126 includes the conductive material exposed outwardly, the connecting portion is clearly visible and distinguishable from the rest of the angular wire 212*a*.

Also, since the connecting portion 2132*a* of the busbar 2132 makes contact with the end surface 2128 of the line portion 2127, when welding the angular wire 212*a* to the busbar 2132, the relative positioning of the angular wire 212*a* with respect to the busbar 2132 is easily determined.

According to the stator 21 of the present preferred embodiment the wire 212 and the busbar 2132 are welded so as to be securely connected, and therefore, the reliability of the stator 21 and the motor 1 having therein such stator 21 is improved. Thus, the motor 1 according to preferred embodiments of the present invention is particularly suitable for use in the compressor of the air conditioner in the motor vehicle from which high reliability is expected.

While the present invention has been described in detail, the foregoing description is in all aspects illustrative and not restrictive. It is understood that numerous variations and modifications can be devised without departing from the scope of the invention.

For example, although the preferred embodiments described above assume that the inner side retaining portion 2134 and the outer side retaining portion 2135 of the busbar plates 2131*p* to 2131*r* are connected to the connecting portion 2136, they do not necessarily need to be connected. Also, the shape of the inner side retaining portion 2135 and the shape of the outer side retaining portion 2135 do not necessarily need to be substantially arc shaped or to have the substantially annular shape as described above.

The shape of the connecting end portion 2126 does not need to be the columnar shape as shown in FIG. 13 in which the diameter of the connecting end portion 2126 at the end surface 2128 is greater than the diameter thereof at the portion furthest away from the end surface 2128. When the shape of the connecting end portion 2126 of the angular wire 212*a* is such that the diameter is the same at the portion thereof near the end surface 2128 and at the portion furthest away from the end surface 2128, an inner side surface 2132*c* of the notched portion 2132*b* arranged at the connecting portion 2132*a* of the busbar 2132 may be tapered such that a gap is formed between the connecting end portion 2126 and the inner side surface 2132*c* of the notched portion 2132*b* for the resin material to be arranged therebetween securing the connection between the angular wire 212*a* and the busbar 2132.

Note that although the preferred embodiments described above assume that the busbar unit 213 includes six individual busbar plates 2131 each having the substantially arc shape, the busbar unit 213 may only include one annular busbar plate 2131, or may include any number of busbar plates 2131. Also note that each busbar plate 2131 may take a shape other than the substantially annular shape or the substantially arc shape.

According to the busbar unit 213 as described above, at least one of the plurality of busbars 2132 of one of the plurality of busbar plates 2131 overlaps in the axial direction with a portion of busbars 2132 of other busbar plates 2131. Therefore, the design freedom of the arrangement of the busbars 2132 is improved, which consequently facilitate the connection between the busbar 2132 and the wire 212. The number of busbar plate 2131 may be varied as long as the number is greater than 2.

Although the above described preferred embodiments assume that the connection between the wire 212 and the busbar 2132 is preferably carried out by the TIG welding, the connection method is not limited thereto. For example, a connection method other than TIG welding, silver soldering, caulking, or the like may be used.

Although the preferred embodiments assume that the coils 215 of the stator 21 are formed by wires 212 wound in the distributed manner, the winding manner of the present invention is not limited thereto. Also, if forming the U-shaped configuration is not optional, the coils 215 may be formed by connecting the angular wire and/or round wire having the straight shape to the busbar unit 213 at above or below the stator core 211.

Although the preferred embodiments assume that the motor according to the present invention preferably is the inner rotor type motor having the field magnet 33 inside the stator 21, the motor according to the present invention may be an outer rotor type motor. Also, the motor according to the present invention may be used as a power source for a hybrid automobile or other devices.

Although the preferred embodiments assume that the connecting end portion 2126 of the angular wire 212*a* is fitted at the notched portion 2132*b* of the busbar 2132, the connecting portion 2132*a* of the busbar 2132 may include a hole portion 2132*d* into which the connecting end portion 2126 it inserted. When the connecting end portion 2126 includes the hole portion 2132*b*, the end surface 2128 of the line portion 2127 makes contact with the hole portion 2132*b* thereby determining effectively the relative position of the busbar 2132 with respect to the angular wire 212*a* and allowing the welding to be carried out efficiently.

Note that the angular wire 212*a* does not necessarily have to have the substantially rectangular shape in cross section at the entire of the angular wire 212*a*, the angular wire 212*a* only needs to have the substantially rectangular shape in the cross section a portion corresponding with the slot 2113.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
- a stator having an annular shape centered about a central axis and including:
  - a stator core having a plurality of teeth extending in a radial direction and arranged so as to be spaced evenly apart from one another in a circumferential direction centered about the central axis;
  - a plurality of wires having a portion extending in a direction that is substantially parallel with the central axis and arranged at a plurality of slots each defined between the teeth;
  - a first busbar plate arranged at one axial side of the stator core and including an insulator retaining a plurality of first busbars connected to a portion of the wires; and
  - a second busbar plate arranged at one axial side of the first busbar plate and including an insulator retaining a plurality of second busbars connected to a portion of the wires.

2. The motor according to claim 1, wherein the plurality of first busbars is arranged radially inwardly of a radially outermost portion of the first busbar plate, and the plurality of second busbars is arranged radially inwardly of a radially outermost portion of the second busbar plate.

3. The motor according to claim 1, wherein the insulator of the first busbar plate includes:
- an inner side retaining portion retaining a portion of the plurality of first busbars; and
- an outer side retaining portion arranged radially outside of the inner side retaining portion and retaining a portion of the plurality of first busbars; wherein
- the wire connected to the plurality of second busbars of the second busbar plate extends through a gap between the inner side retaining portion and the outer side retaining portion.

4. The motor according to claim 1, wherein the first busbar plate and the second busbar plate each have a substantially arc shaped configuration.

5. The motor according to claim 3, wherein the inner side retaining portion and the outer side retaining portion each have a substantially arc shaped configuration.

6. The motor according to claim 1, wherein at least a portion of a pair including one of the plurality of second busbars and one of the plurality of first busbars overlaps in an axial direction.

7. The motor according to claim 1, wherein a connecting portion between the plurality of first busbars and the wire, and a connecting portion between the plurality of second busbars and the wire each are arranged radially inwardly of a radially outermost portion of the stator core.

8. The motor according to claim 1, wherein each of the plurality of wires includes:
- at least a pair of straight portions each correspondingly accommodated in one of the plurality of slots; and
- a connecting portion at an end portion of the pair of straight portions connecting two straight portions making up the pair at one axial side thereof opposite from the stator core.

9. The motor according to claim 8, wherein a cross section of each wire is substantially round and a diameter thereof is greater than approximately 3.16 mm.

10. The motor according to claim 1, wherein the plurality of wires include an angular wire having a substantially rectangular shape at a cross section thereof.

11. The motor according to claim 10, wherein an area of the cross section is greater than about 12.3 $mm^2$.

12. The motor according to claim 1, wherein the wires each include a connecting end portion having a substantially columnar shape whose side surface includes a conductive material, and connected to at least one of the plurality of first busbars and the plurality of second busbars, and an end portion of the connecting end portion is formed radially inwardly of a circumference of the wire.

13. The motor according to claim 12, wherein the wires each include, at an area surrounding the connecting end portion, an end surface connected to one of the plurality of first busbars and one of the plurality of second busbars.

14. The motor according to claim 13, wherein the connecting end portion includes a columnar shape such that an external diameter becomes smaller toward an end portion thereof away from the end surface.

15. A wire in a motor, the wire comprising:
- a line portion; and
- a connecting end portion protruding from an end surface of the line portion, having a side surface including an exposed conductive material, and integrally connected to the line portion; wherein the wire is a wound wire arranged to wind around a plurality of teeth of a stator,
- wherein the connecting end portion includes a columnar shape configured such that an external diameter becomes smaller toward an end portion thereof away from the end surface and,
- wherein the line portion includes a connecting portion and at least a pair of straight portions that are substantially parallel to one another.

* * * * *